Oct. 3, 1939.   E. T. FERNGREN ET AL   2,175,054
APPARATUS FOR FORMING HOLLOW ARTICLES FROM ORGANIC PLASTIC MATERIAL
Original Filed Aug. 10, 1936   24 Sheets-Sheet 1
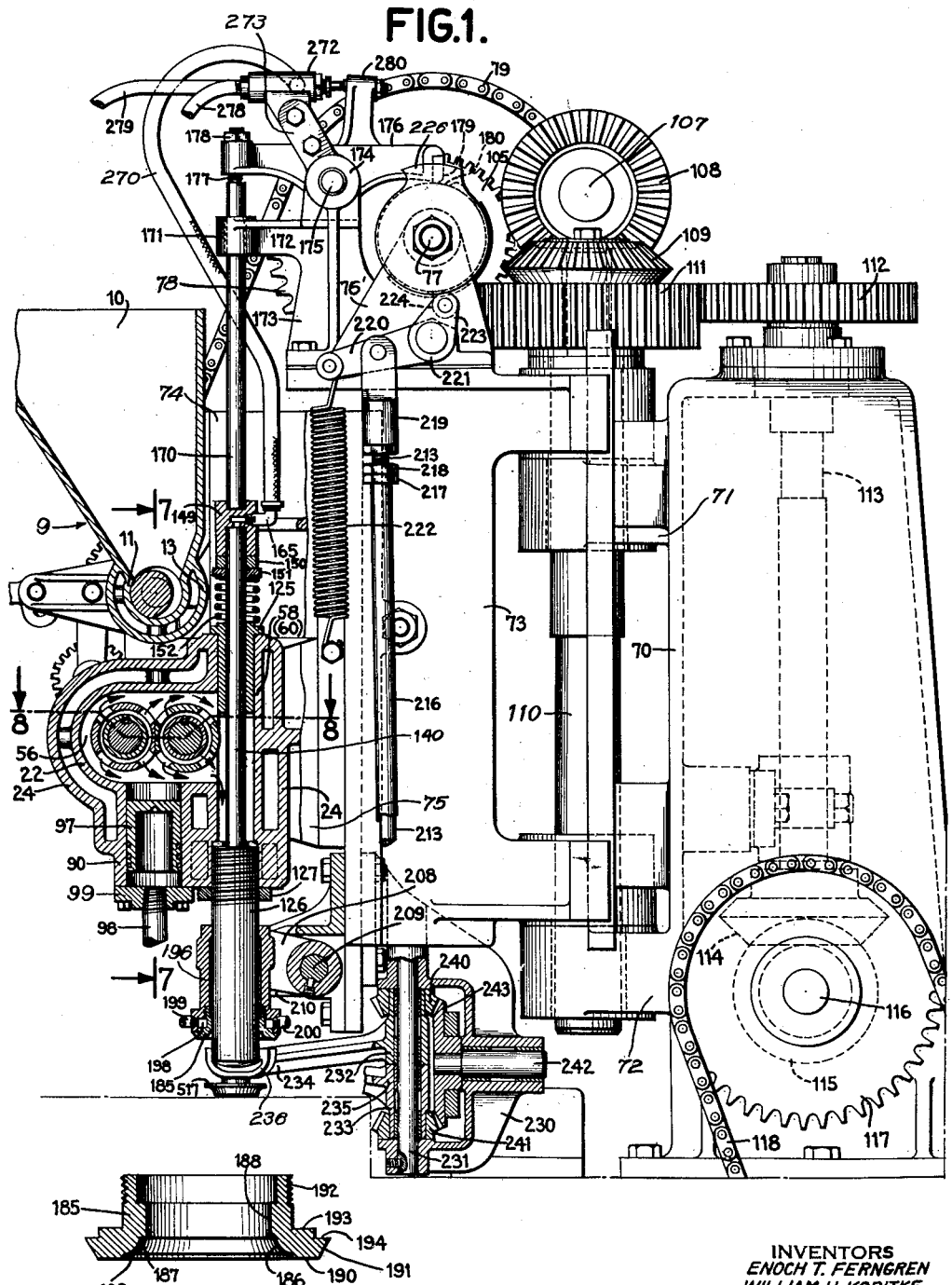
INVENTORS
ENOCH T. FERNGREN
WILLIAM H. KOPITKE
BY Brown & Parham
ATTORNEY

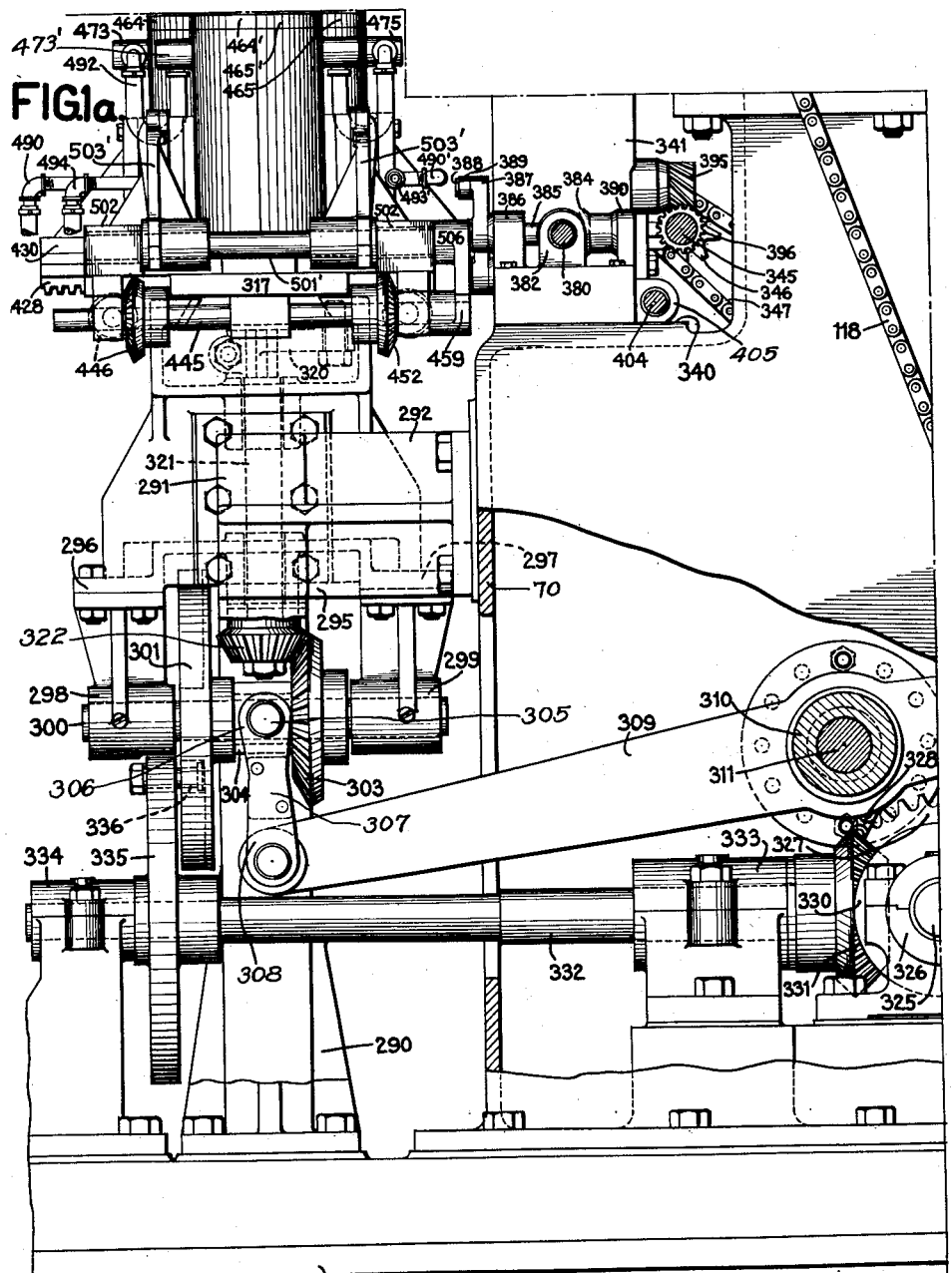

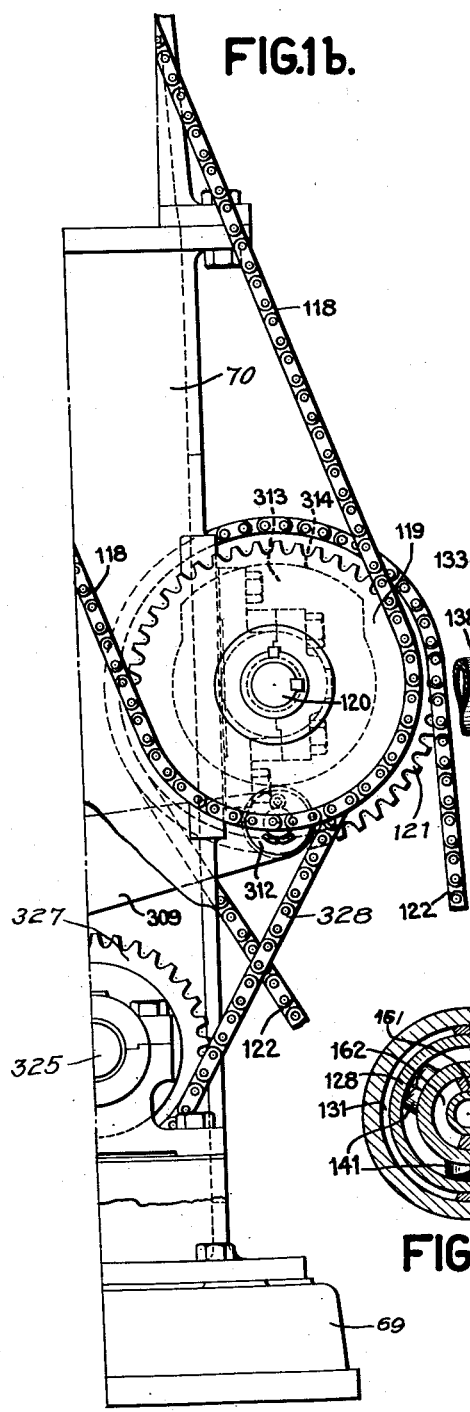

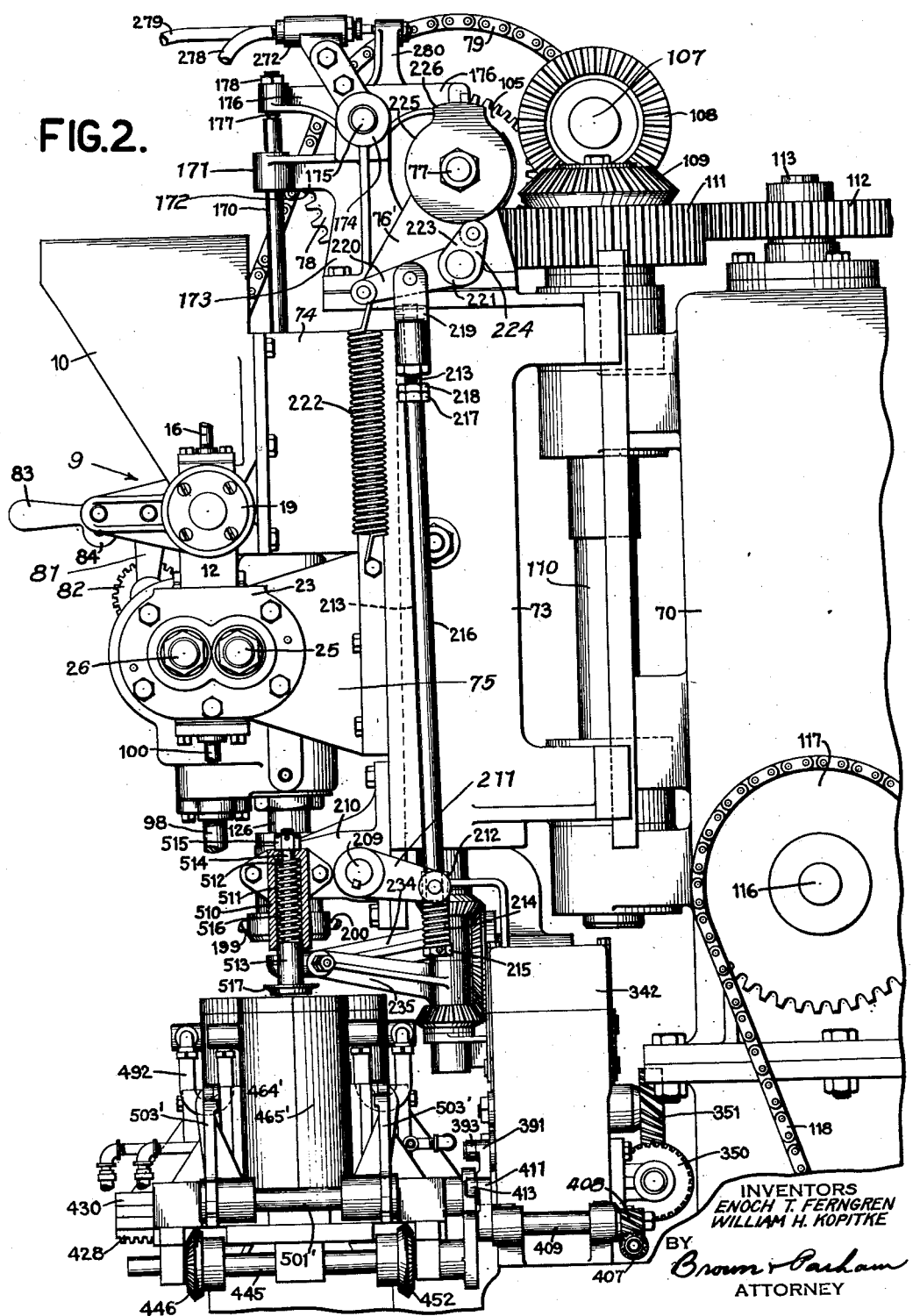

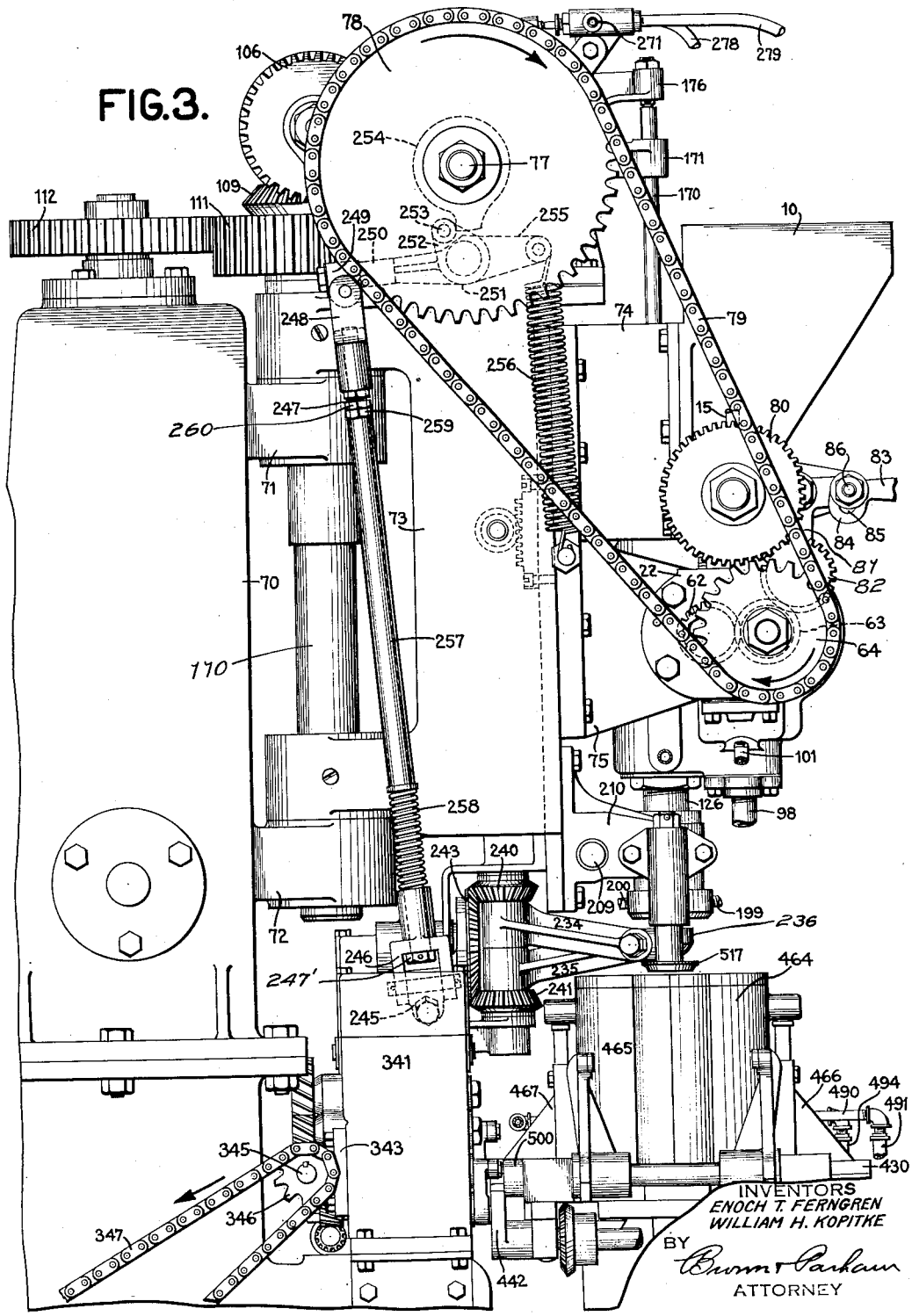

Oct. 3, 1939.    E. T. FERNGREN ET AL    2,175,054
APPARATUS FOR FORMING HOLLOW ARTICLES FROM ORGANIC PLASTIC MATERIAL
Original Filed Aug. 10, 1936    24 Sheets-Sheet 6

INVENTORS
ENOCH T. FERNGREN
WILLIAM H. KOPITKE
BY
Brown & Parham
ATTORNEY

Oct. 3, 1939.    E. T. FERNGREN ET AL    2,175,054
APPARATUS FOR FORMING HOLLOW ARTICLES FROM ORGANIC PLASTIC MATERIAL
Original Filed Aug. 10, 1936    24 Sheets-Sheet 11

INVENTORS
ENOCH T. FERNGREN
WILLIAM H. KOPITKE
BY
Brown & Parham
ATTORNEY

Oct. 3, 1939.  E. T. FERNGREN ET AL  2,175,054
APPARATUS FOR FORMING HOLLOW ARTICLES FROM ORGANIC PLASTIC MATERIAL
Original Filed Aug. 10, 1936    24 Sheets-Sheet 12

INVENTORS
ENOCH T. FERNGREN
WILLIAM H. KOPITKE
BY
ATTORNEY

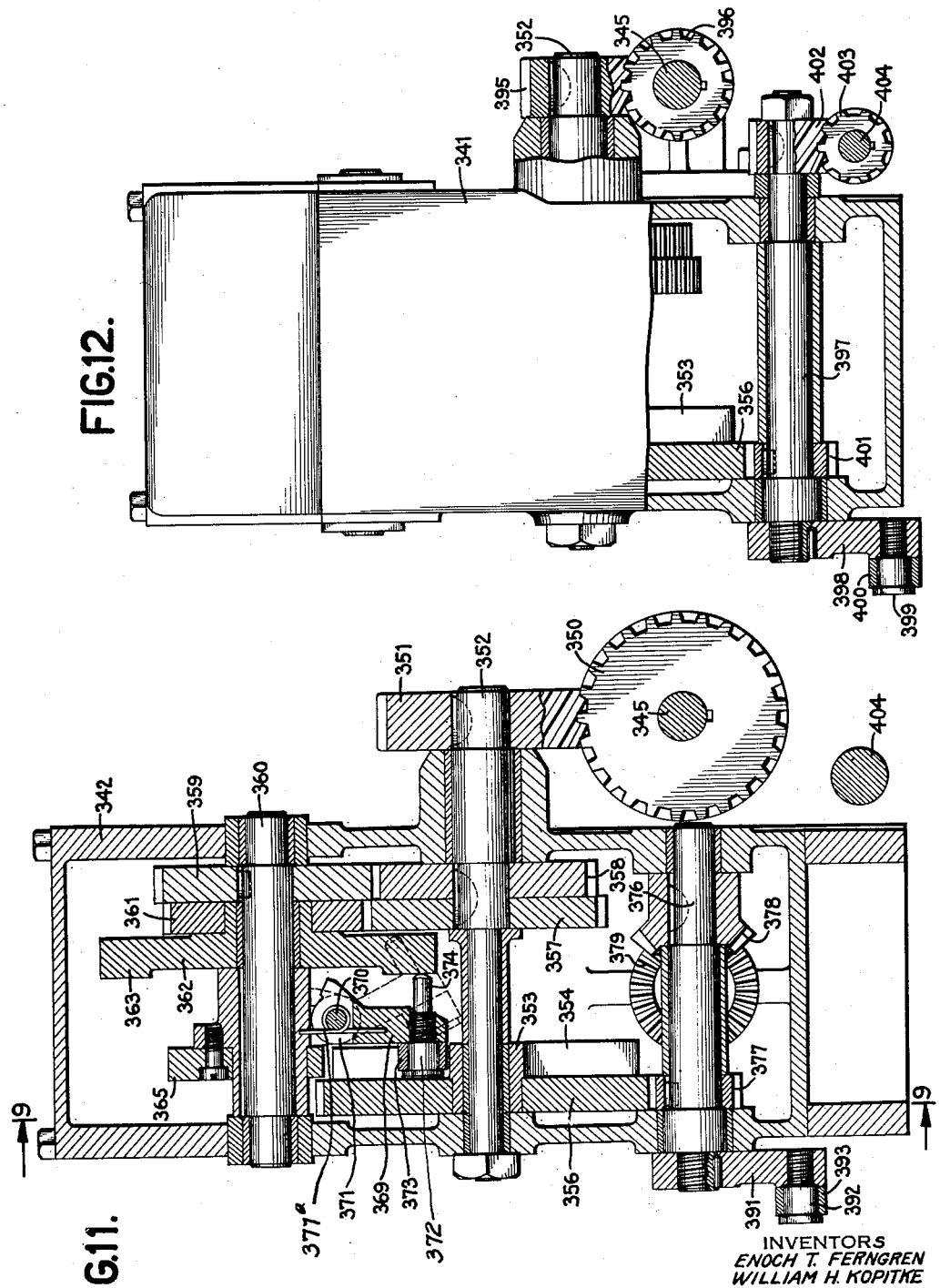

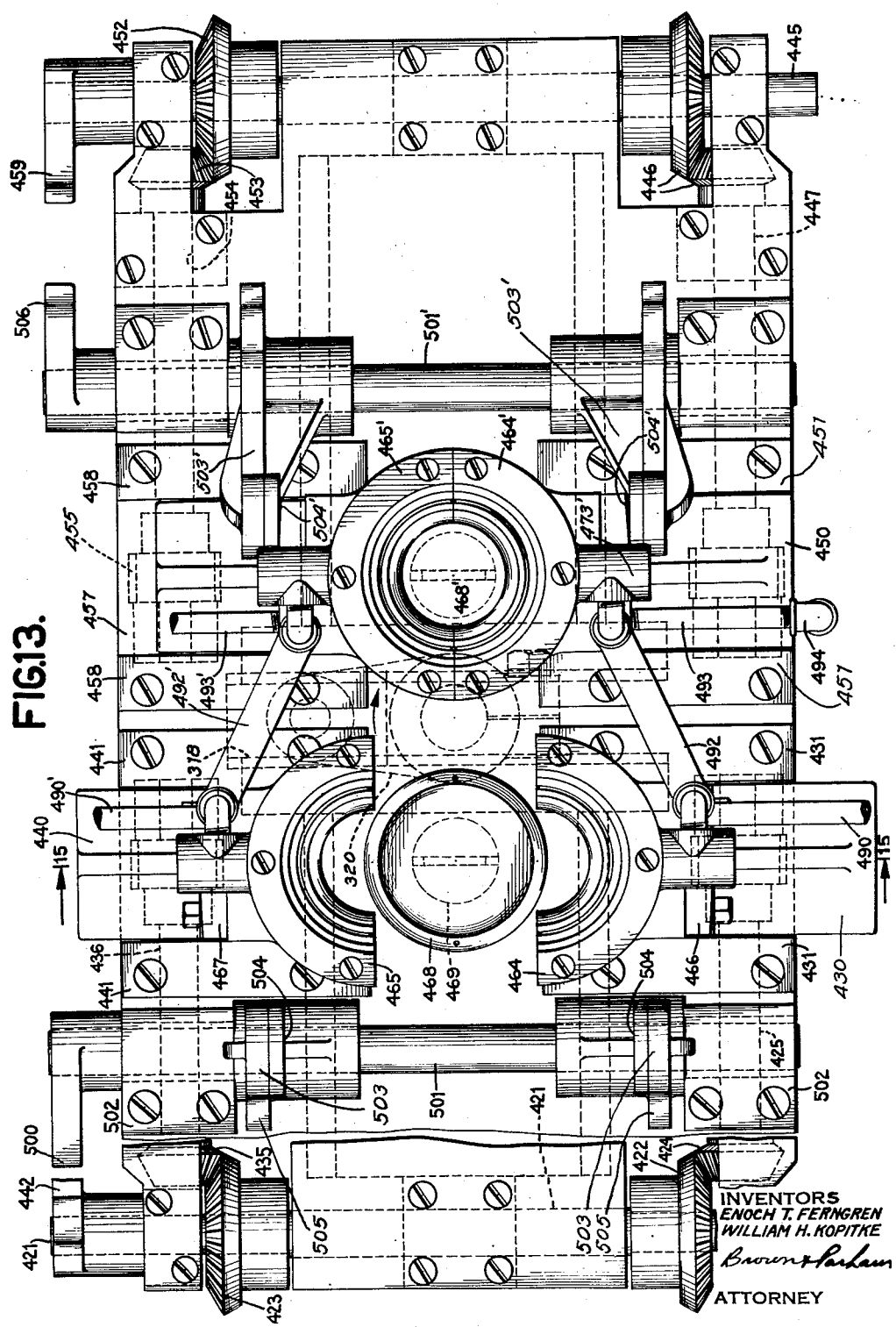

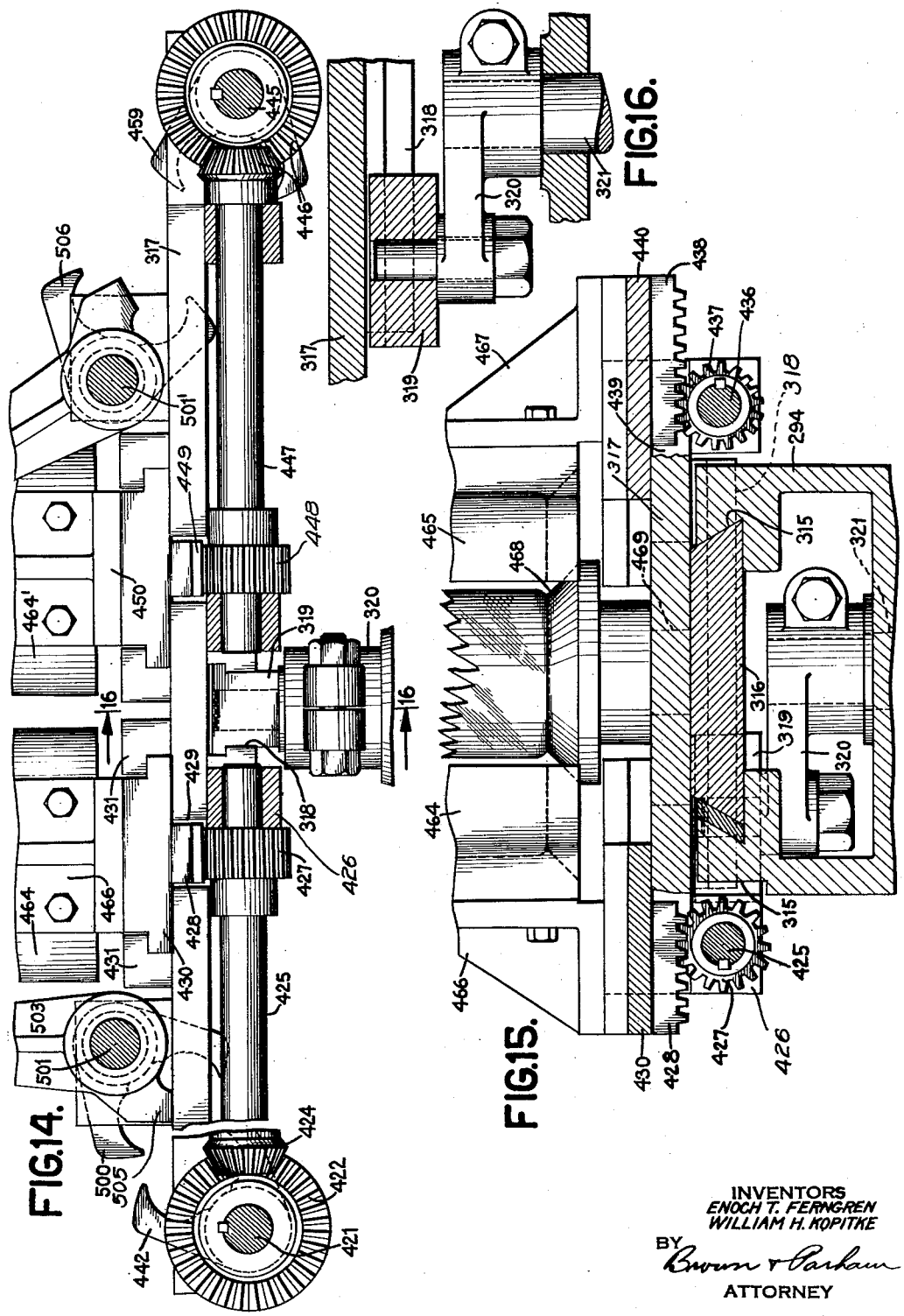

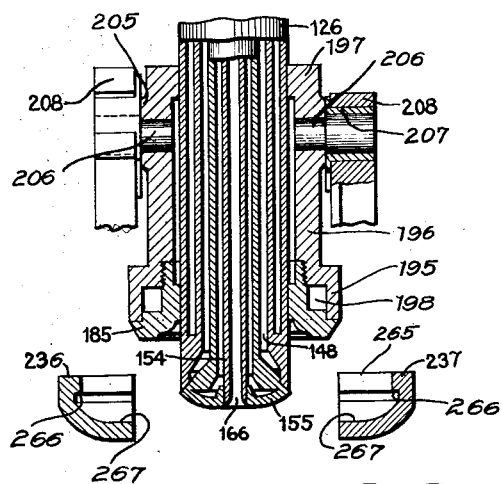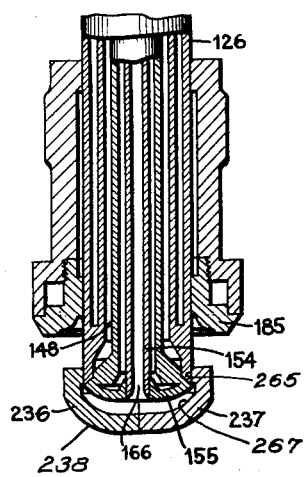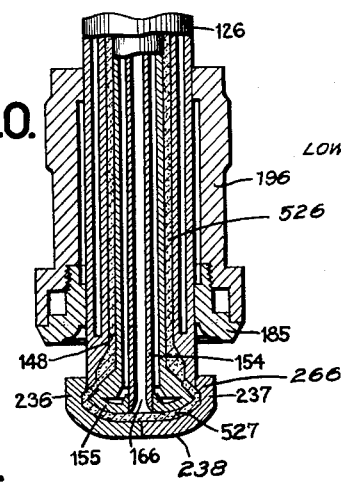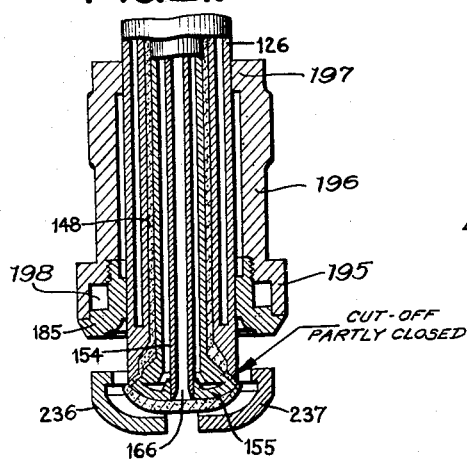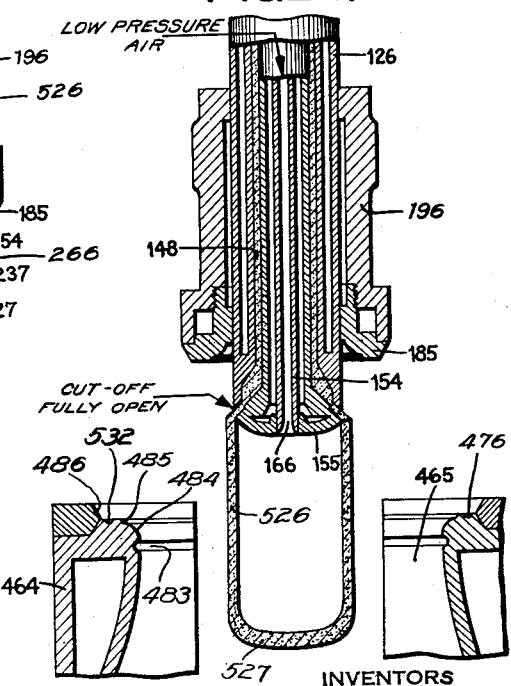

Oct. 3, 1939.   E. T. FERNGREN ET AL   2,175,054
APPARATUS FOR FORMING HOLLOW ARTICLES FROM ORGANIC PLASTIC MATERIAL
Original Filed Aug. 10, 1936   24 Sheets-Sheet 17
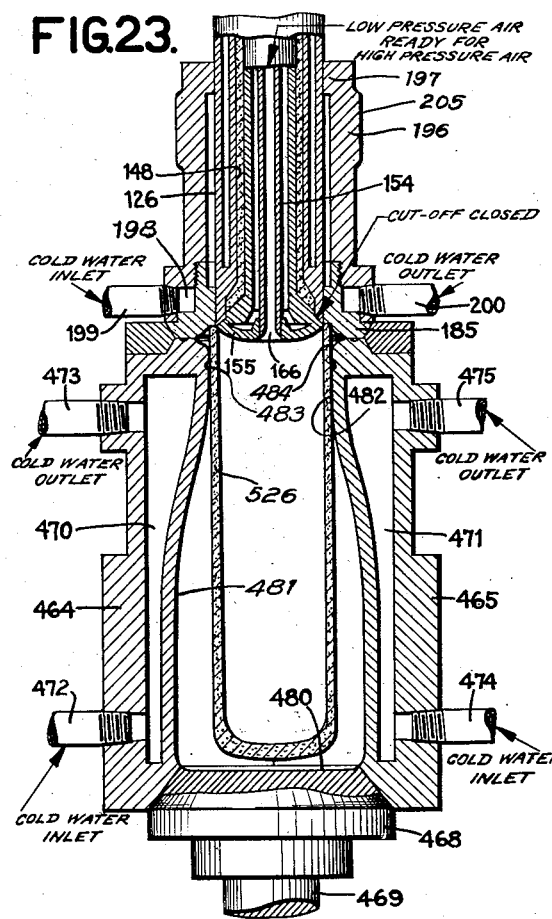
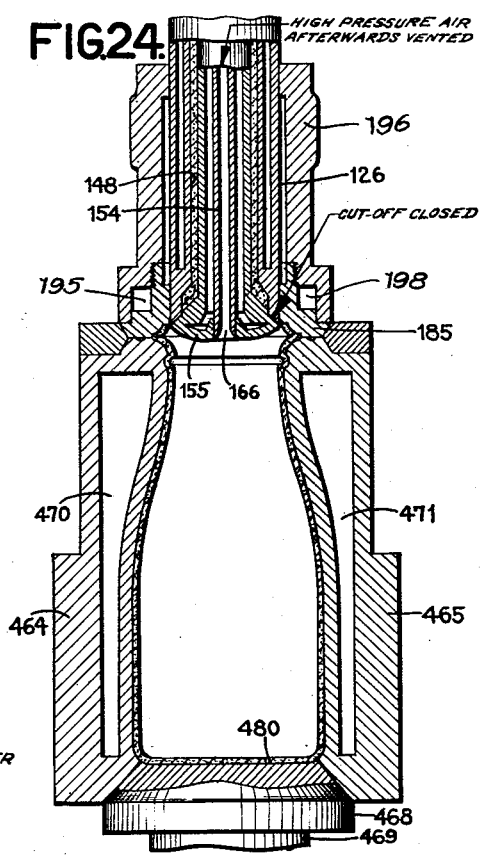
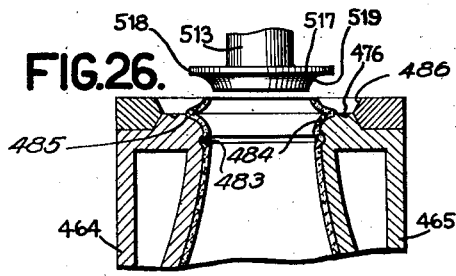
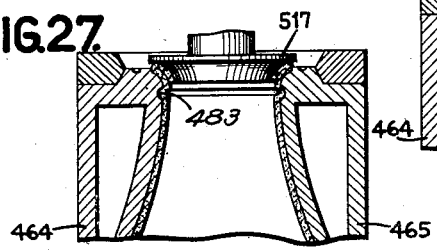
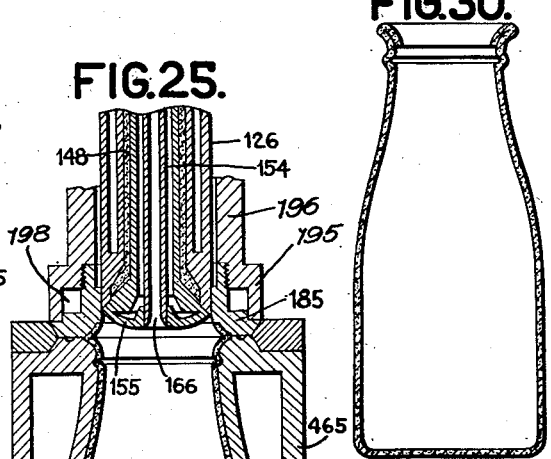
INVENTORS
ENOCH T. FERNGREN
WILLIAM H. KOPITKE
BY Brown & Parham
ATTORNEY Oct. 3, 1939.  E. T. FERNGREN ET AL  2,175,054
APPARATUS FOR FORMING HOLLOW ARTICLES FROM ORGANIC PLASTIC MATERIAL
Original Filed Aug. 10, 1936   24 Sheets-Sheet 18
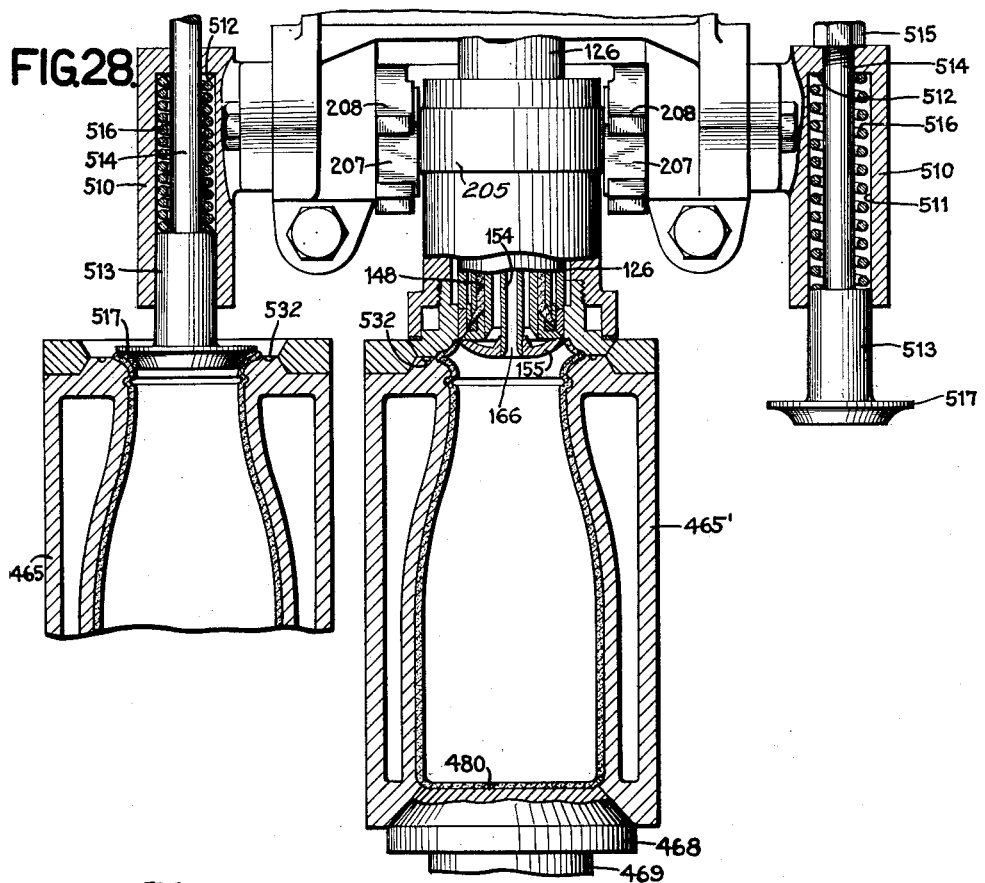
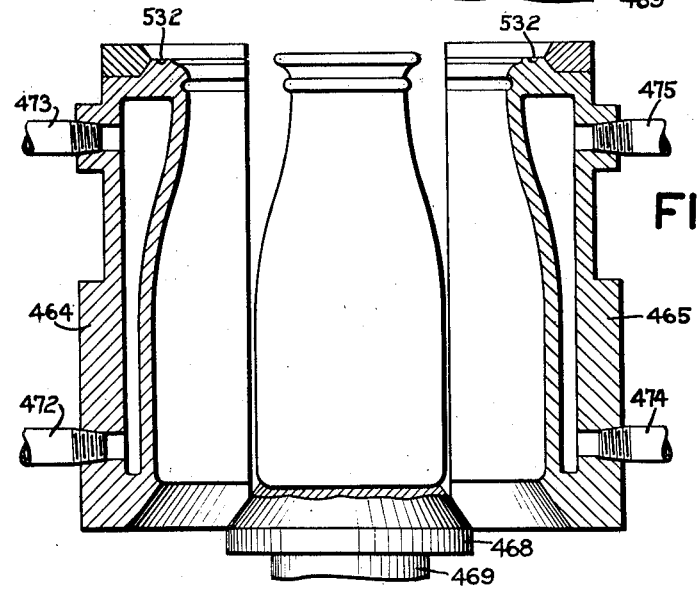
INVENTORS
ENOCH T. FERNGREN
WILLIAM H. KOPITKE
BY
ATTORNEY Oct. 3, 1939. E. T. FERNGREN ET AL 2,175,054
APPARATUS FOR FORMING HOLLOW ARTICLES FROM ORGANIC PLASTIC MATERIAL
Original Filed Aug. 10, 1936 24 Sheets-Sheet 19

INVENTORS
ENOCH T. FERNGREN
WILLIAM H. KOPITKE
BY Brown & Parham
ATTORNEY

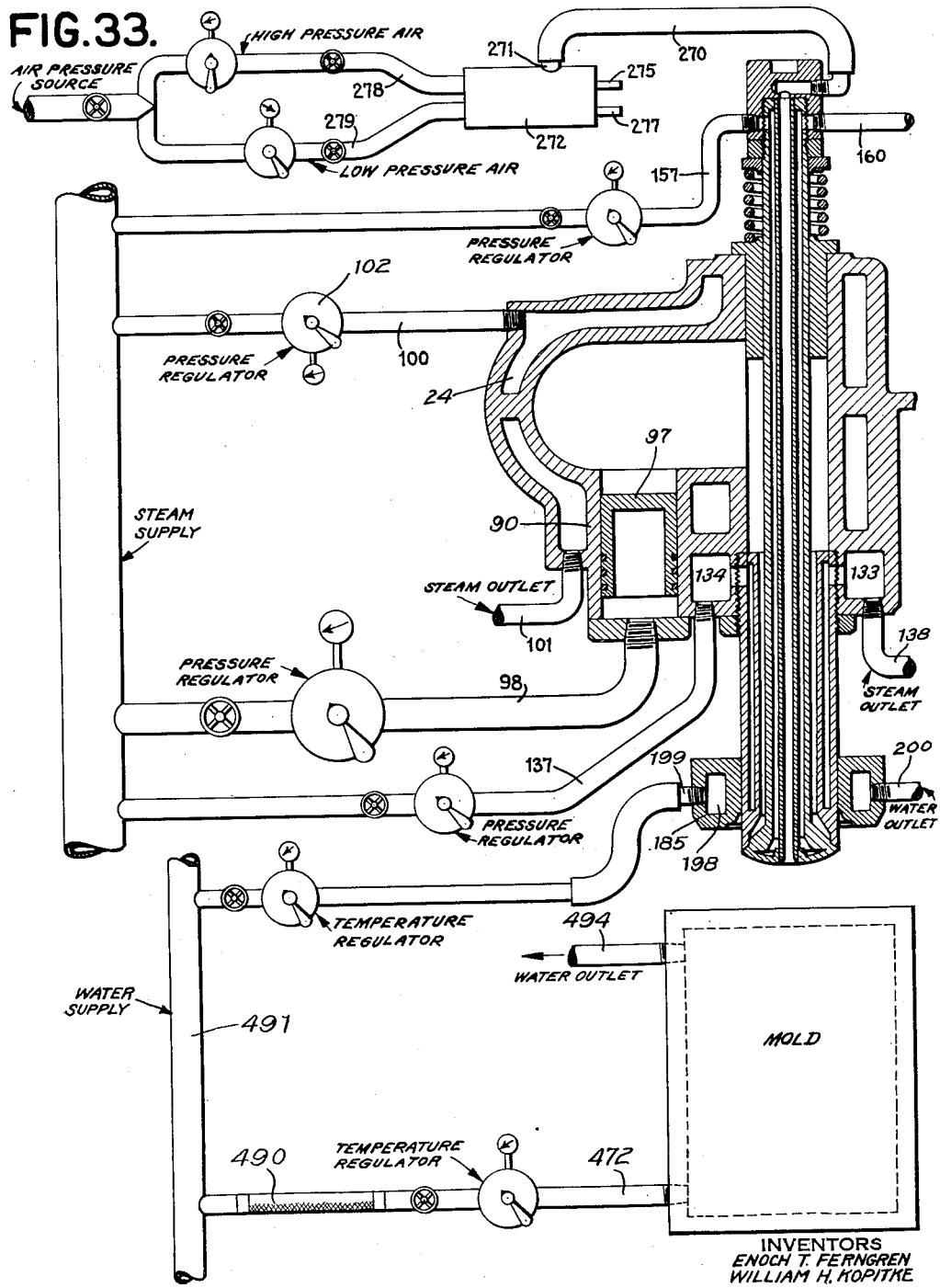

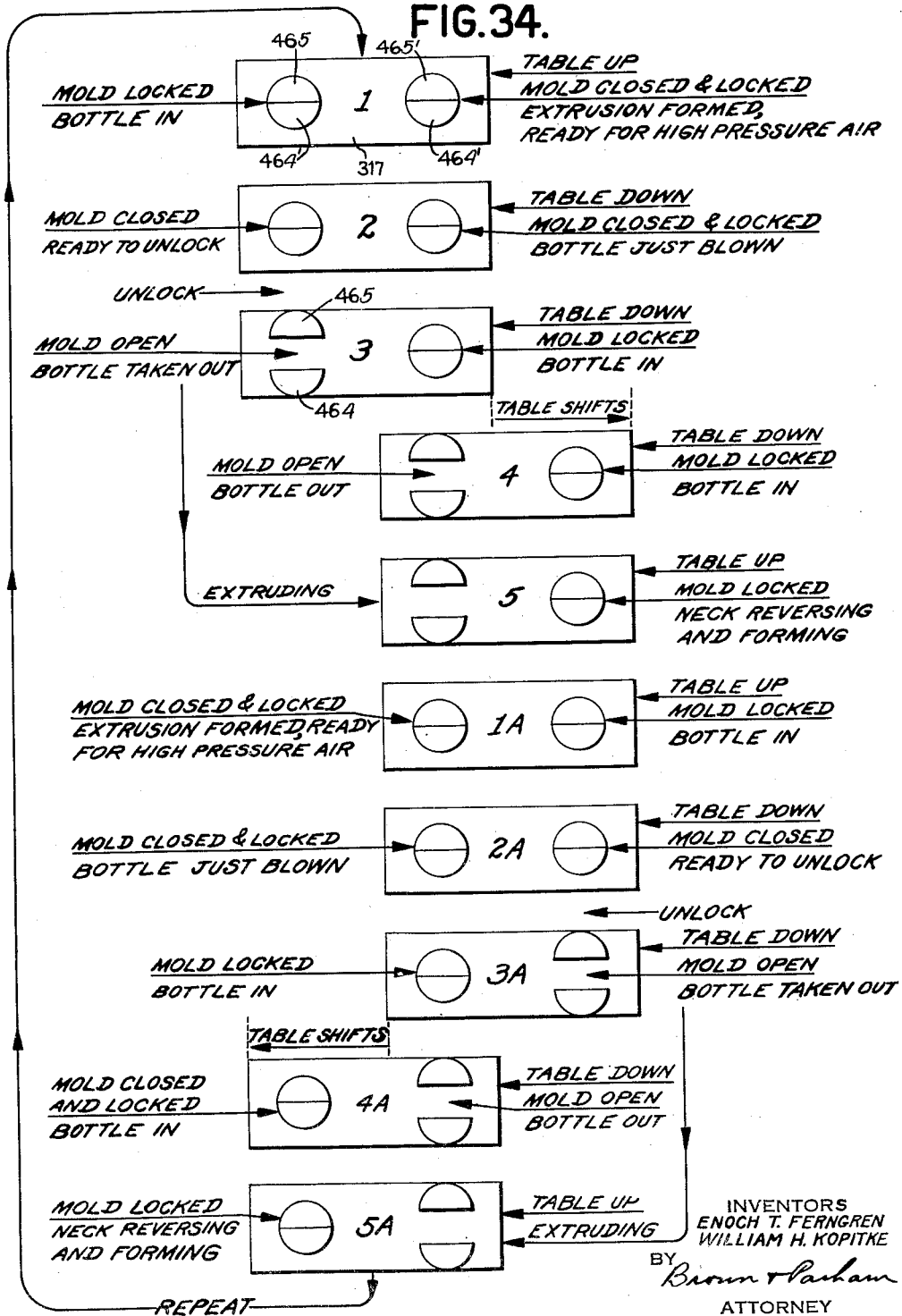

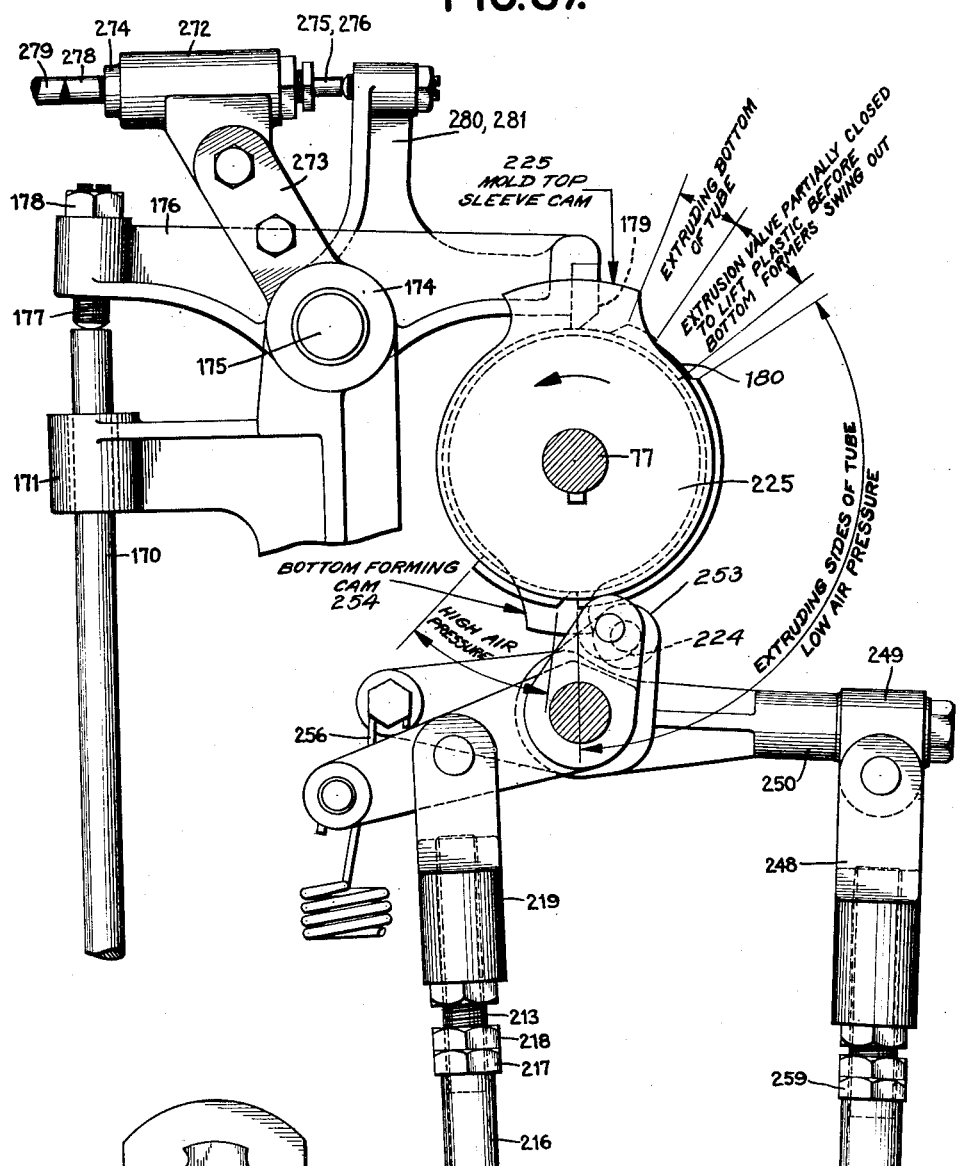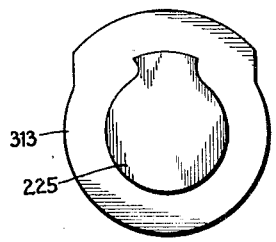

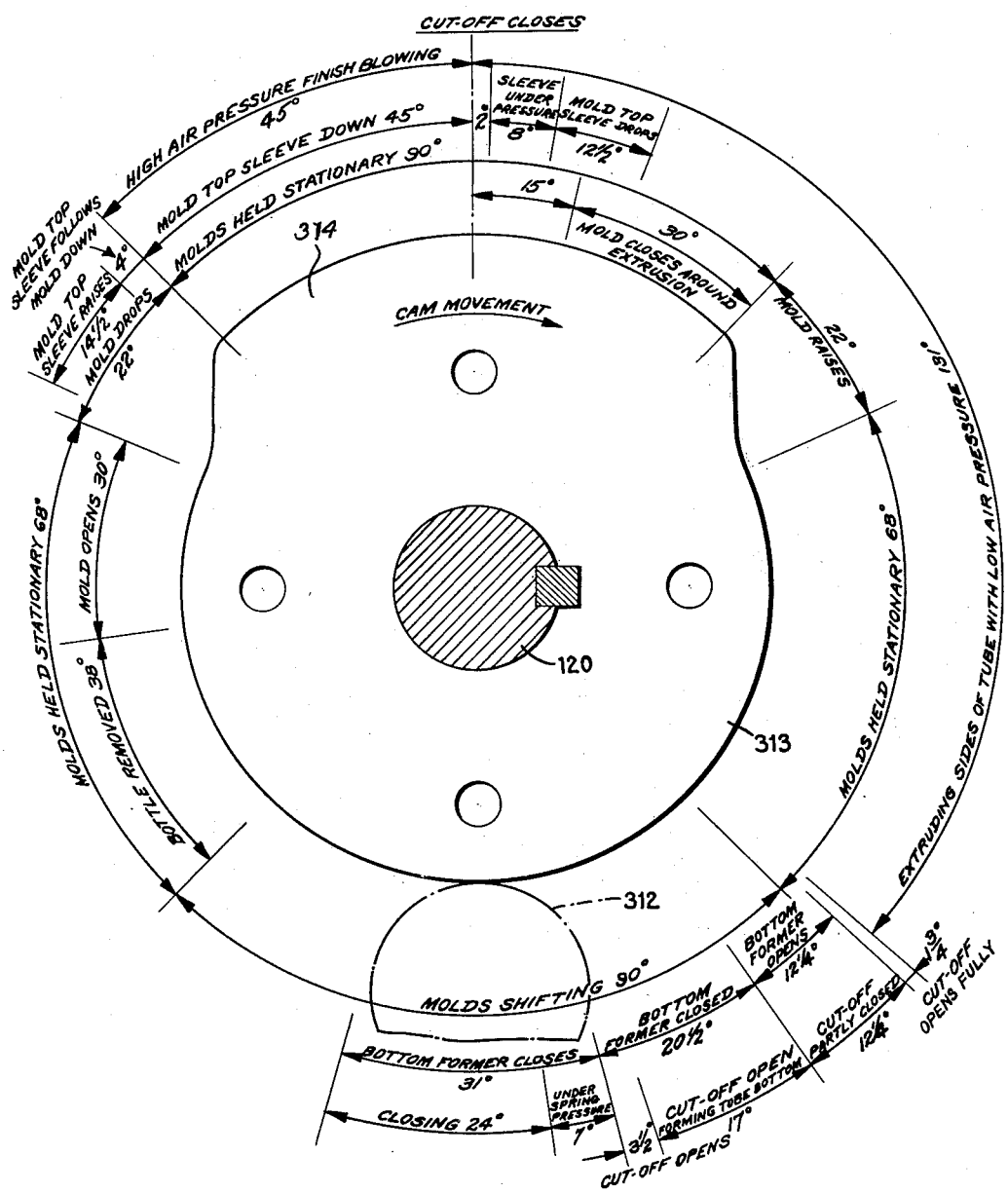

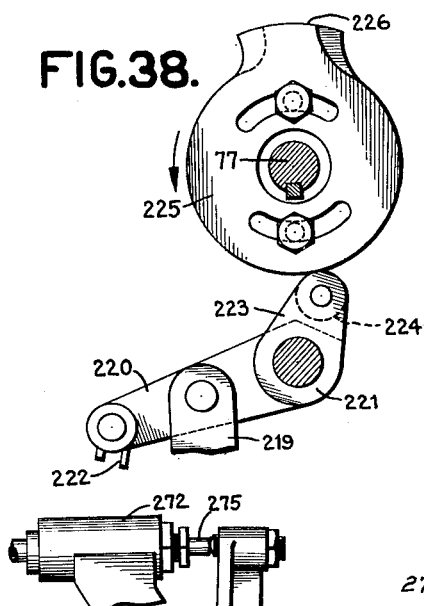
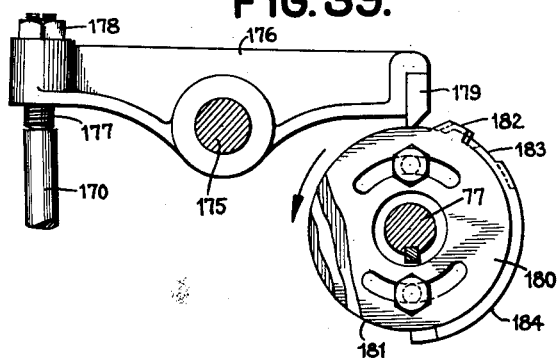
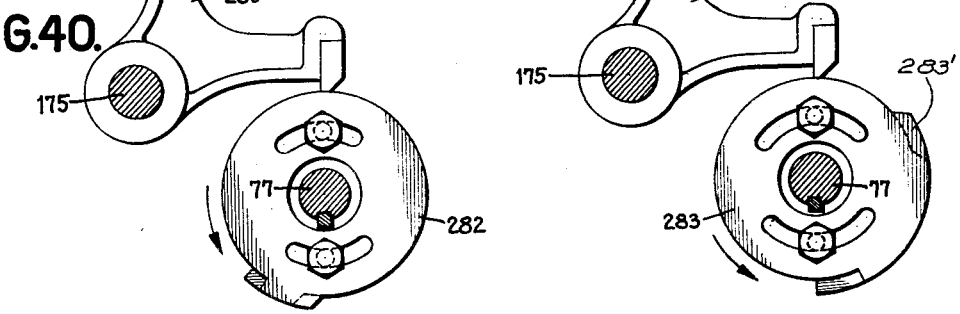
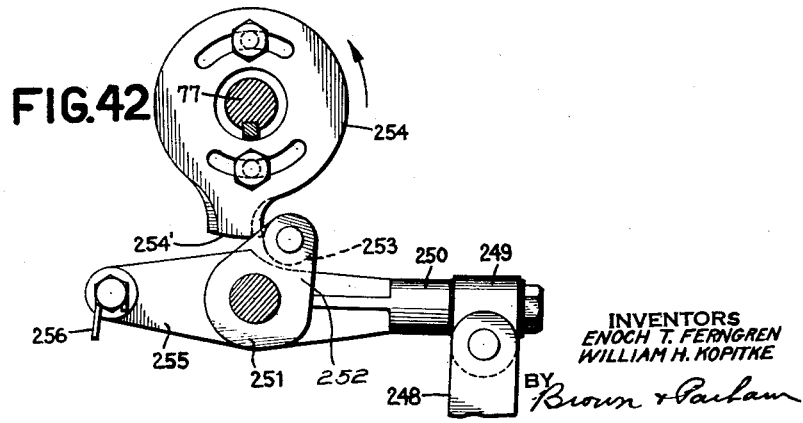

Patented Oct. 3, 1939

2,175,054

UNITED STATES PATENT OFFICE 2,175,054

APPARATUS FOR FORMING HOLLOW ARTICLES FROM ORGANIC PLASTIC MATERIAL

Enoch T. Ferngren, Little Neck, N. Y., and William H. Kopitke, West Hartford, Conn., assignors to Plax Corporation, Hartford, Conn., a corporation of Delaware Continuation of application Serial No. 96,822, August 10, 1936. This application October 18, 1938, Serial No. 235,590

16 Claims. (Cl. 18—5)

The present invention relates generally to apparatus for blowing organic plastic material to form hollow ware and more particularly to combinations and sub-combinations of apparatus for extruding such plastic material as hollow preliminarily shaped bodies and then expanding such bodies by blowing them to the form desired for finished articles and constitutes a continuation of our joint application Serial No. 96,822 filed August 10, 1936.

An object of the present invention is to provide apparatus for operating on organic plastic material under heat and pressure to form hollow articles therefrom.

Another object of the present invention is to provide apparatus for working organic plastic material under heat and pressure to form hollow preliminarily shaped bodies and to expand such bodies or other hollow articles into finished containers by internally applied pneumatic pressure.

Another object of the present invention is to provide apparatus for extruding closed-ended hollow, preliminarily shaped bodies of plastic organic material under conditions of heat and pressure and for maintaining such extruded hollow bodies against collapse by applied internal pneumatic pressure until they are ready to be expanded, whereupon they are expanded or distended by increased internal pneumatic pressure against the inner surfaces of a mold.

Another object of the present invention is to provide apparatus for extruding preliminarily shaped hollow bodies from a parent feeding body of organic plastic material by the pressure applied for plasticating said feeding body.

Another object of the present invention is to provide apparatus for continuously forming an intermittent series of preliminarily extruded shaped bodies and subsequent blown finally shaped articles from organic plastic material which has been plasticated by the application of heat and pressure.

Another object of the present invention is to provide apparatus for working organic material which is strong, resilient and transparent when cooled after having been plasticated and blown and which, when plasticated by heat and pressure, is of a cohesive nature, so that it may be expanded by blowing.

Another object of the present invention is to provide apparatus for forming containers having necks smaller in diameter than the main body thereof by blowing organic plastic material.

Other objects and advantages of the present invention will be apparent from the following description of the structure and operation of the apparatus herein used as an example, from the drawings forming part hereof and from the claims appended hereto.

In the drawings which illustrate an operative embodiment of a machine of the present invention:

Figure 1 is a view principally in elevation and with parts in vertical section taken at the right side of the upper part of the machine;

Fig. 1a is a view similar to that of Fig. 1 showing the lower part of the machine;

Fig. 1b is a view similar to Figs. 1 and 1a showing the lower portion of the machine which was cut off in Figs. 1 and 1a;

Fig. 2 is a view principally in elevation of the upper part of the machine taken from the right hand side similar to Fig. 1 and with fewer parts in vertical section;

Fig. 3 is a view in elevation of the upper part of the machine taken from the left hand side;

Fig. 4a is a view similar to that of Fig. 4 illustrating the lower part and the base of the machine;

Fig. 6a is a view in horizontal section taken along the line 6a—6a of Fig. 6, looking in the direction of the arrows;

Fig. 8a is a view in vertical section taken along the line 8a—8a of Fig. 8 and looking in the direction of the arrows;

Fig. 8b is an enlarged fragmentary detail view partly in elevation and partly cut away and in horizontal section of the lower central portion of parts shown in Fig. 8;

Figure 9:
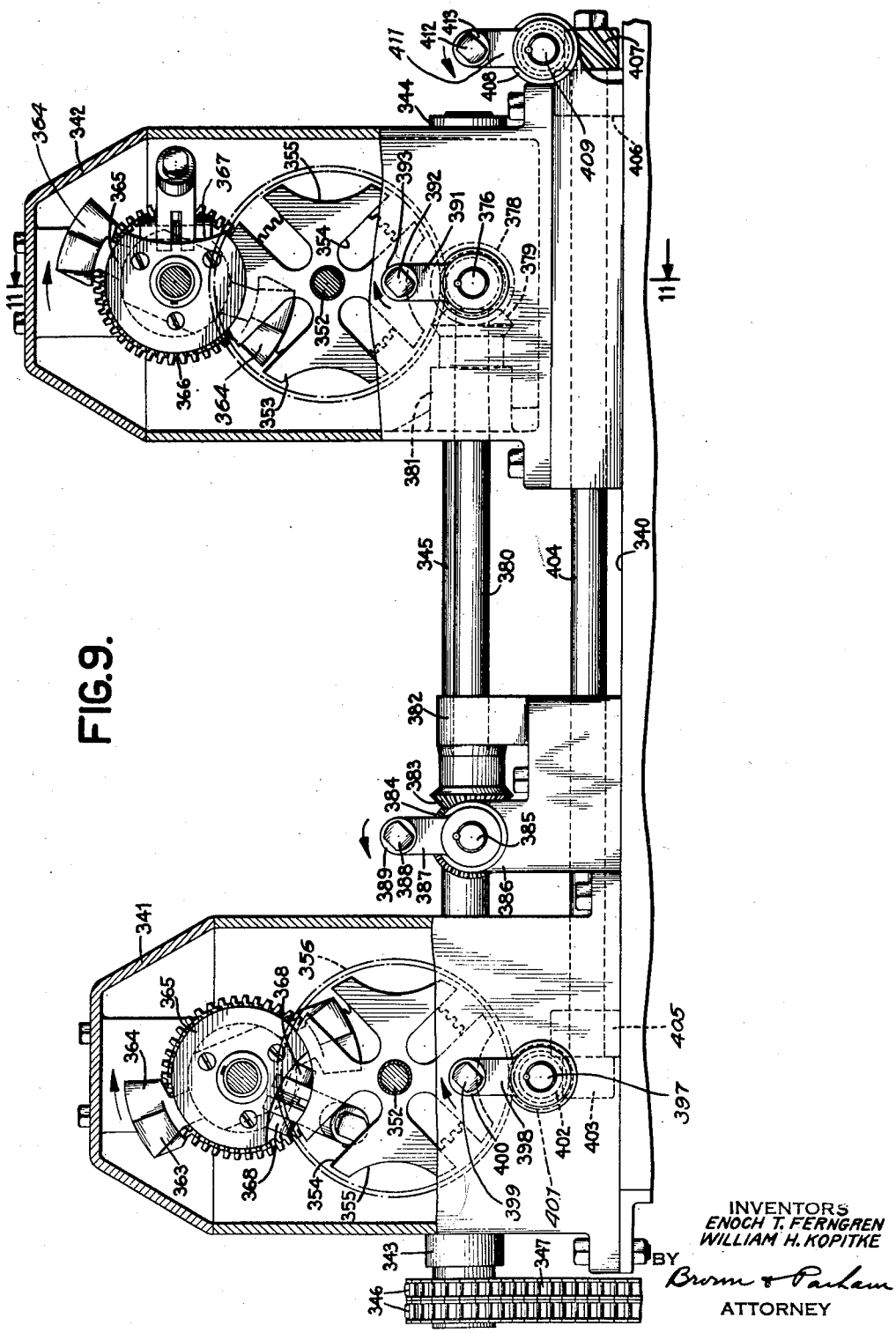
Figure 10:
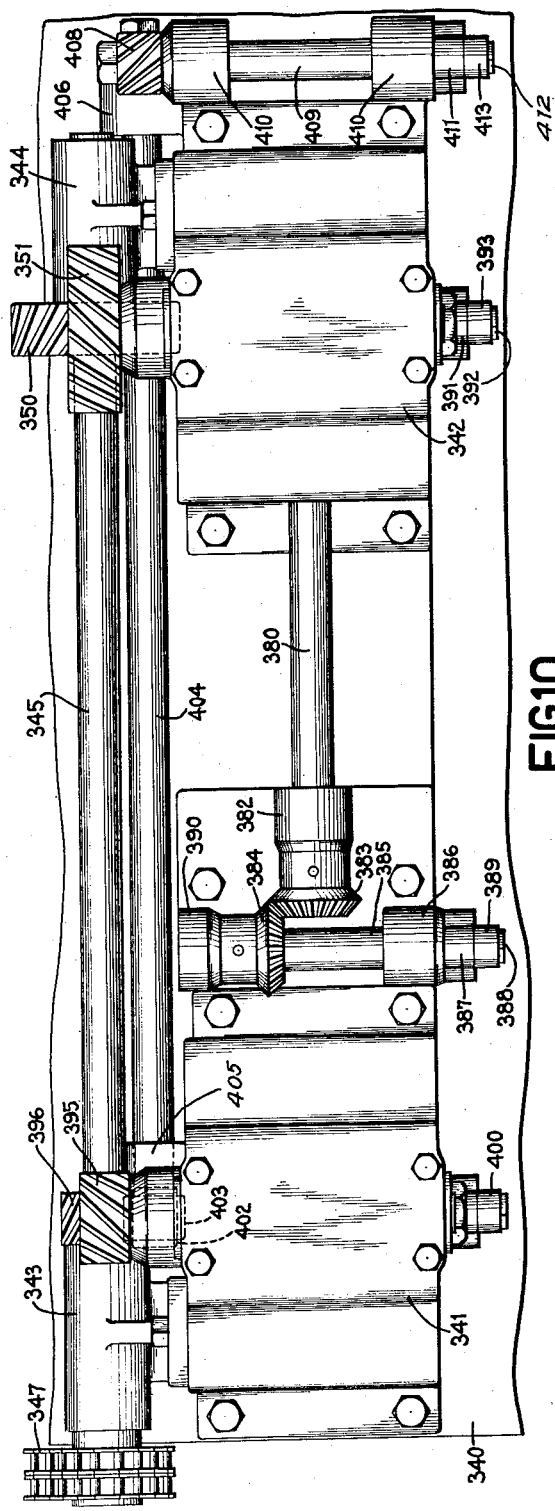
Figure 31:
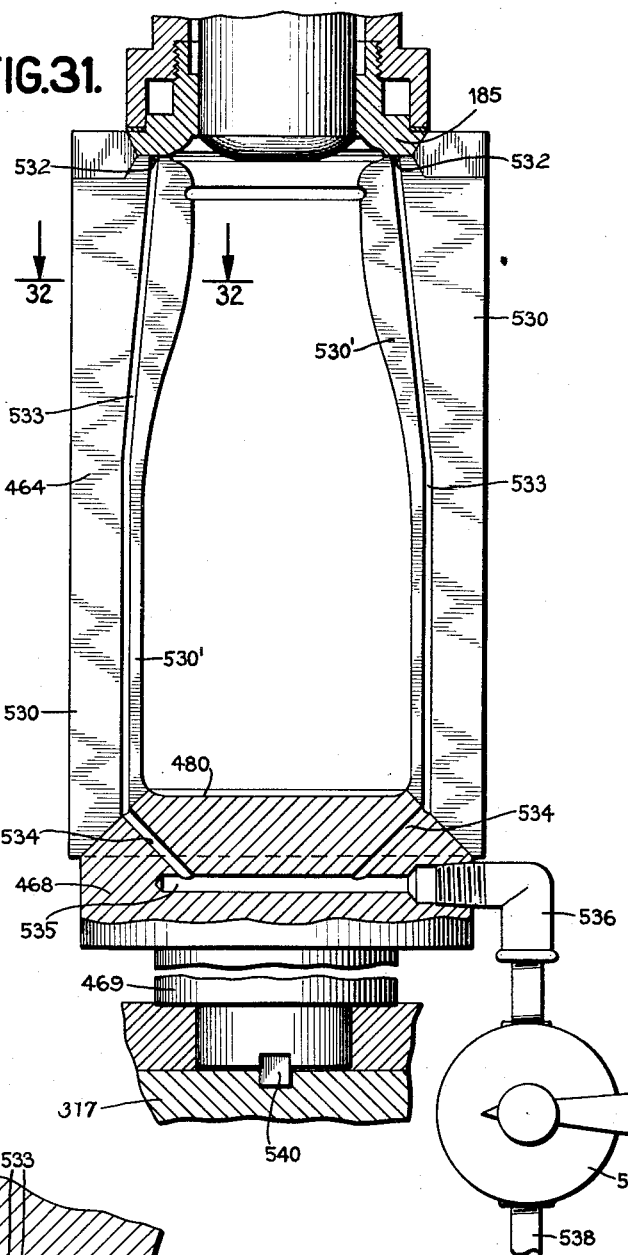
Figure 32:
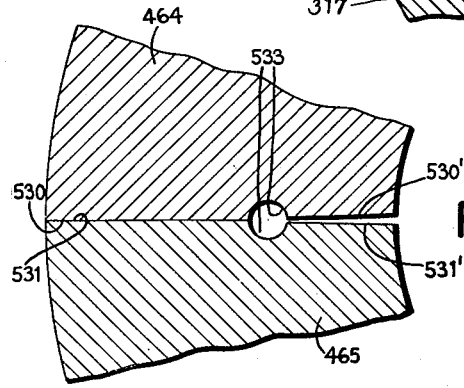

Figs. 8c and 8d are fragmentary detail views in vertical section taken along the lines 8c—8c and 8d—8d respectively of Fig. 8b, looking in the direction of the arrows;

Fig. 9 is a view partly in elevation and partly in vertical section on the line 9—9 of Fig. 11, of the mechanism for opening, closing, locking and unlocking the molds;

Fig. 10 is a plan view of the parts shown in Fig. 9;

Fig. 11 is a view in vertical section taken substantially along the line 11—11 of Fig. 9 and looking in the direction of the arrows;

Fig. 12 is a view partly in elevation and partly in vertical section of that part of the mechanism of Fig. 9 at the left hand end of that figure and looking from the right;

Fig. 13 is a plan view with parts broken out and omitted for space requirements of a set of molds, together with opening, closing, locking and unlocking mechanisms therefor;

Fig. 14 is a view principally in elevation and with parts broken away and in vertical section of the mechanism of Fig. 13;

Fig. 15 is a view principally in vertical section taken along the line 15—15 of Fig. 13 and looking in the direction of the arrows;

Fig. 16 is a fragmentary view in vertical section taken along the line 16—16 of Fig. 14 and looking in the direction of the arrows, showing mechanism for laterally shifting the table that carries the molds;

Fig. 17 is a view in central vertical section of a mold top ring;

Figs. 18 to 29 inclusive are a series of somewhat diagrammatic views in vertical section of the extrusion tube and of molding and forming elements cooperable therewith, illustrating a process of operating the apparatus of the preceding figures;

Fig. 30 is a view in vertical section of a bottle made with the apparatus of the present invention;

Fig. 31 is a view principally in central vertical section of a mold and portions of certain cooperative parts including an exhaust pressure regulator;

Fig. 32 is an enlarged fragmentary view in horizontal section taken along the line 32—32 of Fig. 31 looking in the direction of the arrows;

Fig. 33 is a diagrammatic view with some parts shown in vertical section of the extrusion tube of the present invention together with conduits for steam for heating and for pressure and conduits for high and low air pressure, together with regulators therefor;

Fig. 34 is a flow sheet showing a certain series of steps in the movement of the table which carries the molds of the machine and showing relative positions of the molds in open or closed relation at such positions of the table;

Fig. 35 is a diagram of two cams, which are on different shafts, showing the relative positions of their actuating portions;

Fig. 36 is a circular or cycle flow sheet applied to an elevational view of the cam used for raising and lowering the mold table;

Fig. 37 is a fragmentary view in elevation of certain cams mounted on a common shaft and associated mechanism with legends indicating their functions; and Figs. 38 to 42 inclusive are fragmentary elevational views of the several cams and associated mechanism shown in Fig. 37, in which the cams are shown in corresponding positions to each other on their common shaft.

GENERAL ORGANIZATION OF MACHINE AND ITS PRINCIPLE MECHANISMS

*Material feeding and plasticating means*

Referring now to the drawings, particularly Figs. 1 to 5 and 7, a feeder 9 includes a feed hopper 10 which tapers downwardly to a hollow horizontal cylinder 11, the latter having an opening midway between its ends to receive material from the hopper 10. At both ends the hollow cylinder 11 opens into downwardly extending discharge ducts 12. About the hollow cylinder 11 is a cooling jacket 13, which has an inlet pipe 15, Fig. 7, at one end and an outlet pipe 16 at the other end for conducting a cooling fluid to and from the jacket 13, the pipes 15 and 16 being provided with regulating valves, (not shown). Within the hollow cylinder 11 a dual screw 17 is rotatably mounted, there being an integral bearing 18 at one end and a removable bearing 19 at the other end thereof. The dual screw 17 has the opposite helical screw portions 20 and 21 which, upon rotation in the proper direction, are adapted to feed material from the hopper 10 in opposite directions to the ducts 12. The circumferential surfaces of the screws 20 and 21 fit closely the inner surface of the hollow cylinder 11. Beneath the hollow cylinder 11 is mounted a horizontal casing 22, the inner surface of which is formed as the surfaces of two parallel intersecting cylinders, Fig. 8a. Extending upwardly from the horizontal casing 22 at each end thereof are inlet ducts 23, each of which receives the lower end of one of the discharge ducts 12, there being a space between the inner surface of each inlet duct 23 and its associated discharge duct 12. About the horizontal casing 22 extends a heating jacket 24, which is shown as integral therewith.

Through the horizontal casing 22 there extends a pair of horizontal shafts 25 and 26, which are rotatable in bearings 27—28 and 29—30 respectively, carried by end plates 31 and 32 secured to the horizontal casing 22 at the opposite ends. The horizontal shafts 25 and 26 are positioned with their axes respectively coincident with the axes of the intersecting cylindrical surfaces forming the inner surface of the horizontal casing 22.

On the shafts 25 and 26, near the longitudinal center of the horizontal casing 22, are mounted rings 35 and 36. Against the sides of these rings are pairs of sleeves 37 and 38 respectively. The ring 35 and sleeves 37 are held for rotational movement with the shaft 25 by a key 39; and the ring 36 and sleeves 38 are similarly held on the shaft 26 by a key 40, the keys 39 and 40 extending substantially the full length of the horizontal casing 22. Each of the sleeves 37 and 38 is substantially cylindrical on its outer surface 41 for the greater portion of the distance from its outer end inwardly, and then tapers inwardly to form a frusto-conical surface 42, Fig. 8b, toward the rings 35 and 36 respectively. The inner ends of the sleeves 37 and 38 are of greater diameter than the outer diameter of the associated ring 35 or 36, whereby an annular channel is formed by the outer cylindrical surface of each of the rings 35 and 36 and the inner ends of the respectively associated sleeves 37 and 38. On each of the sleeves 37 and 38, at the confluence of the cylindrical surface 41 and the frusto-conical surface 42 thereof there is provided a plurality of spaced depressions 43, from each of which there extends outwardly a groove 44 parallel to the axis of the sleeve.

About the rings 35 and 36 and their associated sleeves 37 and 38 are outer sleeves 45 and 46 respectively, the outer surfaces 47 of which are cylindrical and closely fitted to the inner surface of the horizontal casing 22. Each of the outer sleeves 45 and 46 has a substantially tangential plane surface 48, Figs. 8c and 8d, where the outer surfaces 47 of the sleeves 45 and 46 intersect, the outer surfaces 48 bearing against each other and serving to hold the outer sleeves 45 and 46 against rotation with their associated rings 35 and 36 and the sleeves 37 and 38 respectively. Opposite the respectively associated rings 35 and 36, the outer sleeves 45 and 46 have formed in their inner surfaces annular channels 50 of about the same axial length as the rings 35 and 36. From the channels 50 the inner surfaces 51 of the sleeves 45 and 46 taper outwardly in both directions substantially parallel to and extending beyond the frusto-conical surfaces 42 of the sleeves 37 and 38. The surfaces 51 are closely spaced to the frusto-conical surfaces 42, the space preferably being between about .0001 and .010 inch. Beyond the depressions 43 the sleeves 45 and 46 form with the outer surfaces 41 of the sleeves 37 and 38 tapering circumferential or annular spaces 52. A circumferential series of depressions 53 are formed in each of the inner surfaces 51 of the sleeves 45 and 46 opposite the depressions 43 and are connected respectively with grooves 54, which extend outwardly to the ends of the outer sleeves 45 and 46. The outer sleeves 45 and 46 are of shorter length than the total lengths of the associated set of rings 35 or 36 and their associated sleeves 37 and 38, so that the outer ends of the sleeves 37 and 38 project beyond the outer ends of the outer sleeves 45 and 46.

The inner casing 22 has formed integrally therewith, midway between its outer ends, a circumferential rib 55 inside which is formed a circumferential channel 56, which is connected with the channels 50 through a plurality of ports 57 formed in the outer sleeves 45 and 46. At one side the horizontal casing 22 has formed thereon a vertical rib 58, Figs. 1 and 8, which joins the circumferential rib 55 and has formed therein a vertical cylindrical passage 59, which connects with the circumferential channel 56. The heating jacket 24 is formed to conform with this vertical rib 58 and is provided with an extension surrounding a tube 60 formed in part by the vertical rib 58 and including the vertical cylindrical passage 59. On each end of each of the shafts 25 and 26 between the sleeves 37 and 38 and the corresponding bearings 27, 28, 29 and 30, a substantially square-cut screw 61 is mounted and keyed to the associated shaft by the keys 39 and 40. Each of the screws 61 meshes with an adjacent one thereof on the opposite shaft. The screws 61 in the pairs at either end of the shafts 25 and 26 are pitched to feed material from the inlet ducts 23 toward the center of the horizontal casing 22, as hereinafter set forth. At their outer ends, near the bearings 27 and 29, the shafts 25 and 26 carry intermeshing pinions 62 and 63 respectively. The shaft 26, beyond the pinion 63, carries a driving sprocket 64.

Resting on a base 69, a hollow vertical standard 70, Figs. 1, 1a, 2 and 3, carries outwardly extending brackets 71 and 72, which in turn hingedly carry a vertical support 73. The support 73 carries vertically extending brackets 74, which support the unit comprising the hopper 10 and the hollow cylinder 11 and its cooling jacket 13. A pair of vertically extending brackets 75 also mounted on the support 73 carry the horizontal casing 22 and its heating jacket 24. The support 73 carries at its upper end a pair of bearing brackets 76 and 76' in which is journaled a horizontal shaft 77 parallel to the screw 17 and the shafts 25 and 26. At its outer end above the sprocket 64, the shaft 77 carries a driving sprocket 78 which is arranged to drive the sprocket 64 through a sprocket chain 79. At its outer end beyond the bearing 18 the feed screw 17 carries a pinion 80, Fig. 7, which is in the plane of and above the pinion 63. The cooling jacket 13 carries a pivoted link 81, Fig. 4, which at its outer end carries a pinion 82 movable by the link 81 into and out of driving mesh with the pinions 63 and 80, whereby the screw 17 can be driven from the shafts 25 and 26 or can be stationary while the latter are running. For the purpose of throwing in or out the drive for the screw 17 there is provided a handle 83 on the link 81 for moving the pinion 82 into and out of driving engagement with the pinions 63 and 80. An enlargement 84, Figs. 2 and 3, is provided on the handle 83 having a slot 85 therein through which passes a set screw 86 threaded into an opening in the casing 13.

Figure 7:
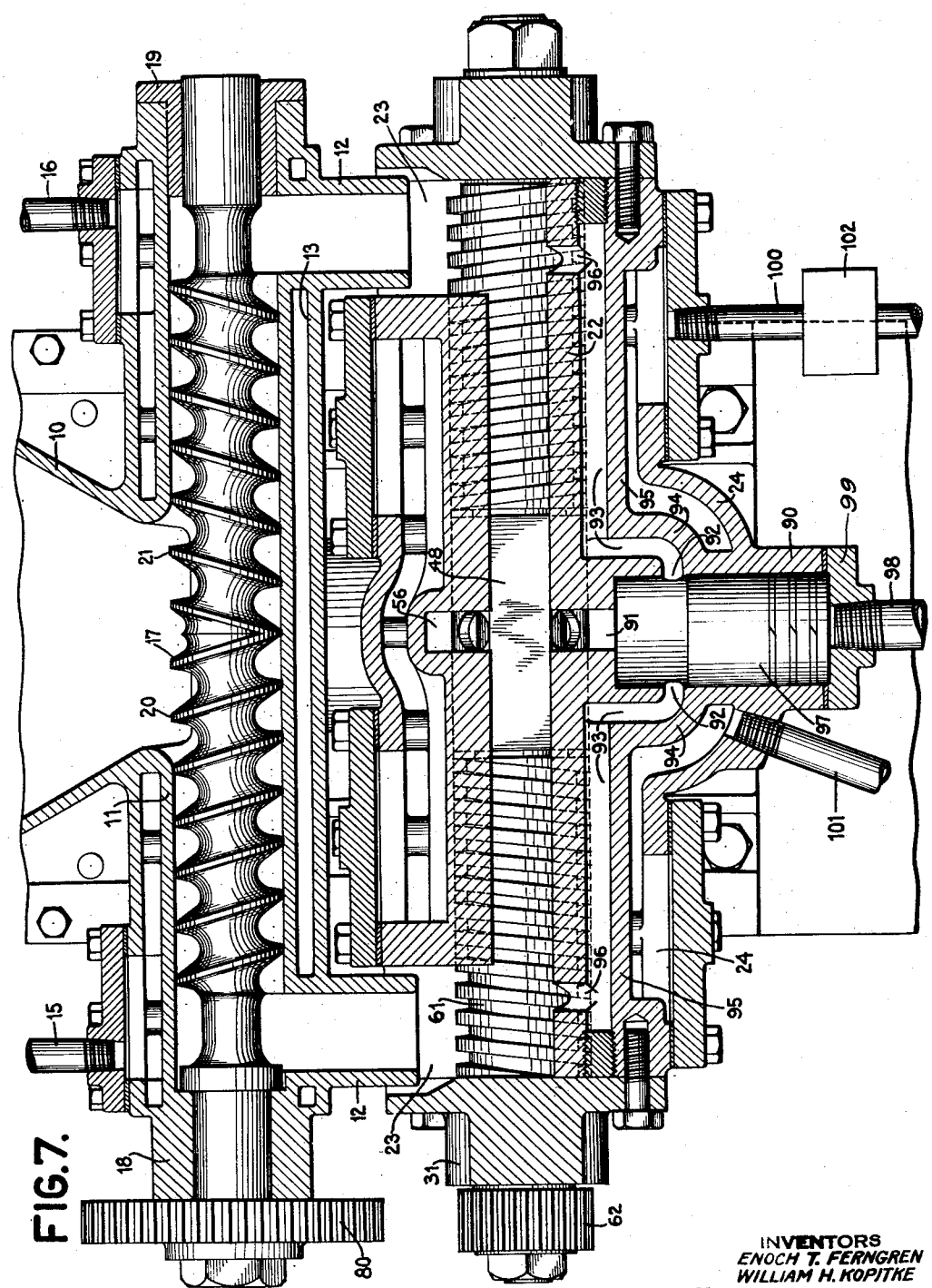
Fig. 7 is a view in vertical section on the line 7—7 of Fig. 1, showing a mixing apparatus and a plasticating and feeding arrangement.

Referring particularly to Figs. 1 and 7, the horizontal casing 22 carries a cylinder 90 which extends downwardly therefrom and is integral therewith. At the upper end of the chamber of the cylinder 90, a port 91 connects to the circumferential channel 56. From a point below the upper end of the cylinder 90 a pair of ports 92 connect with passageways 93 formed in ribs 94 and 95, which are formed respectively on the outer walls of the cylinder 90 and the lower wall of the horizontal casing 22. The passageways 93 extend substantially to the opposite ends of the horizontal casing 22 with which they connect through ports 96 at points substantially below the inlet ducts 23. A piston 97 is freely movable in the cylinder 90. A pipe 98 carried by the lower head 99 of the cylinder 90 serves for applying steam or air under a preferably constant pressure to the lower end of the cylinder 90 beneath the free piston 97. In its upward movement toward the top of the cylinder 90, the piston 97 will partly or completely shut off the ports 92 and further serve to decrease the space between the top of the piston 97 and the port 91.

Figure 4:
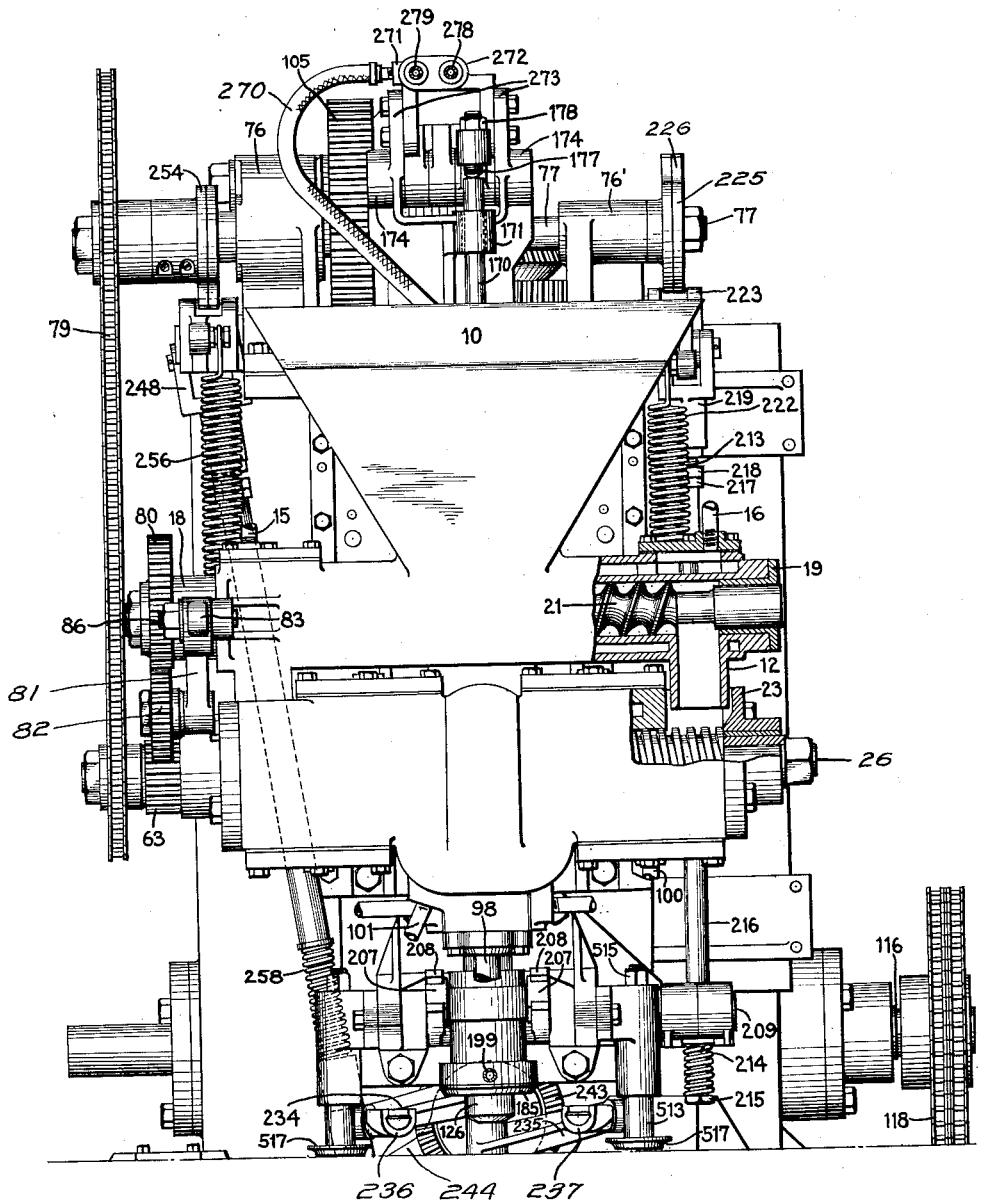
Fig. 4 is a view in front elevation of the upper part of the machine in part cut away and in vertical section.

As shown in Figs. 1 and 7, the heating jacket 24 extends downwardly about the cylinder 90 and the vertical rib 58 (tube 60) to provide heat for the material plasticized by heat and pressure in the horizontal casing 22. An inlet pipe 100 and an outlet pipe 101, Figs. 4 and 7, provide passage for a suitable temperature controlling fluid medium such as steam to and from the heating jacket 24, the inlet pipe 100 being provided with a regulator 102, shown diagrammatically in Fig. 33, for automatically controlling the steam pressure for the purpose of regulating the temperature in the horizontal casing 22 to a given point or within a given range, it being understood that this regulation can be effected manually when desired.

Figure 5:
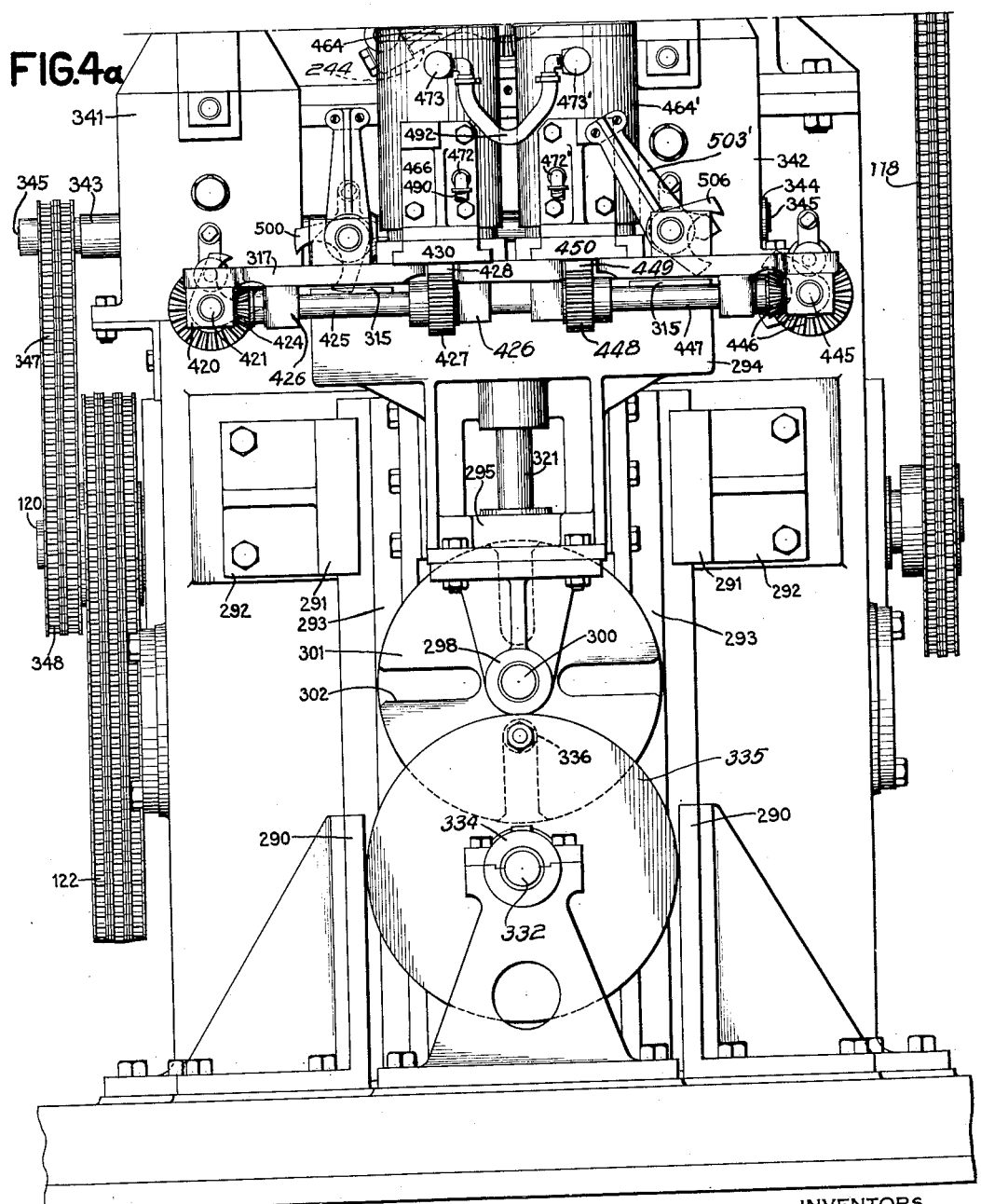
Fig. 5 is a plan view of the machine.

The shaft 77 is driven by a gear 105, Figs. 2 and 5, fixed thereon, which meshes with a gear 106 mounted on a parallel shaft 107 for fixed rotation with a bevel gear 108. The gear 108 meshes with a bevel gear 109 loosely mounted on a shaft 110 for fixed rotation with a spur gear 111. The gear 111 meshes with a gear 112 fixed to a vertical shaft 113, which at its lower end has fixed thereto a bevel gear 114, Fig. 1, meshing with a bevel gear 115 fixedly mounted on a horizontal shaft 116. The shaft 116 carries a sprocket 117 which is driven by a chain 118, Figs. 1 and 1b, from a sprocket 119 mounted on a shaft 120. At its opposite end the shaft 120 carries a sprocket 121, Figs. 1b and 4a, which is driven through a chain 122, the latter being driven in suitable manner by any suitable driving means such as an electric motor (not shown).

*The extrusion nozzle and associated means*

Figure 6:
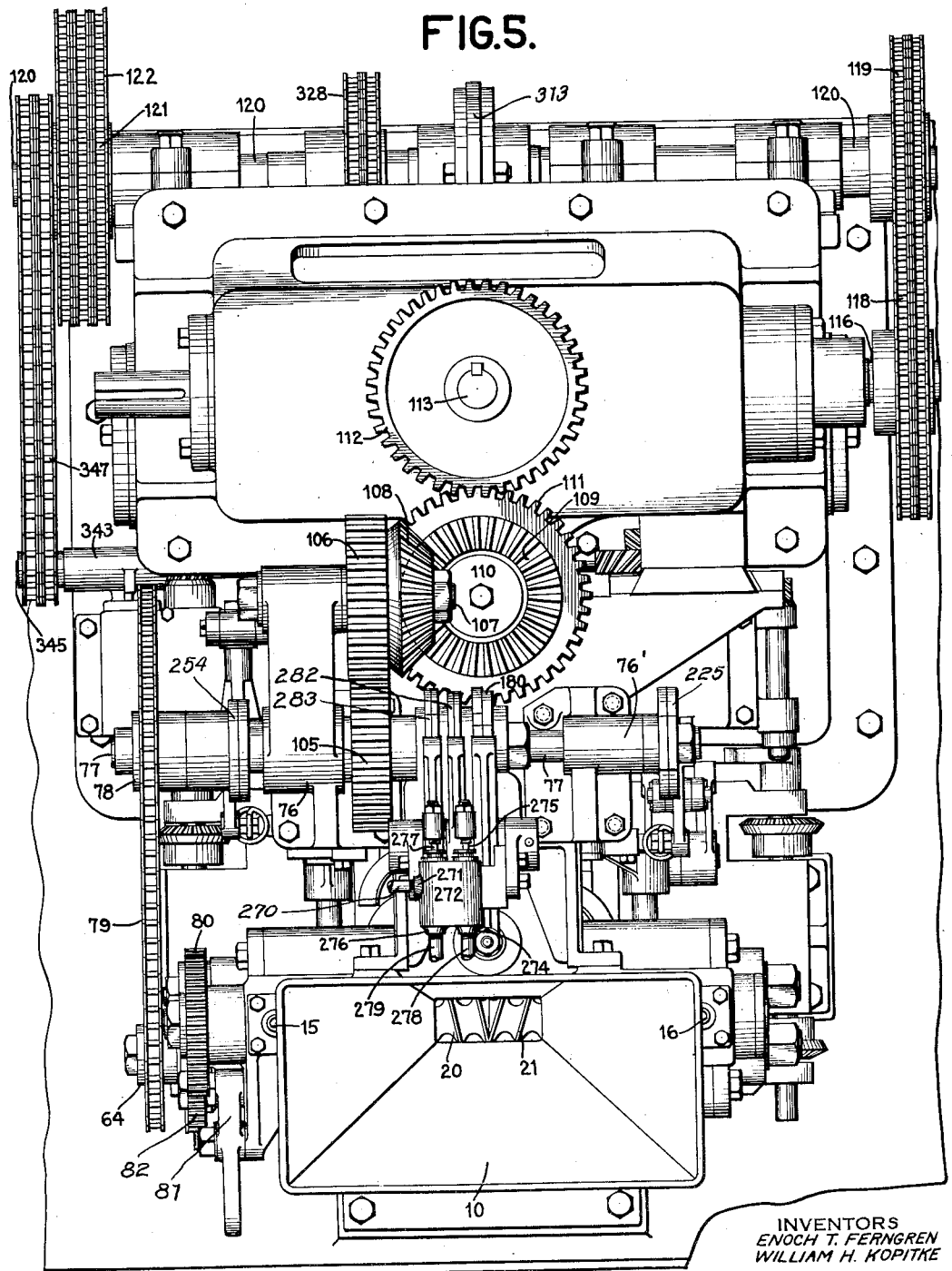
Fig. 6 is a view in central vertical section with parts broken out and omitted for space requirements, of the apparatus used for extruding plastic material in tubular form.

Referring particularly to Figs. 1 and 6, there is mounted in closing relation in the upper end of the cylindrical passage 59 a bushing 125, the inner surface of which is finished for a bearing. Into the lower end of the cylindrical passage 59 there is threaded a tube 126, which is held secure by a lock nut 127. Within the tube 126 is mounted a concentric tube 128, which is of smaller outside diameter than the inside diameter of the tube 126, the tubes 126 and 128 being held apart in sealed relation by upper and lower spacing rings 129 and 130 respectively whereby to define a heating chamber 131. Extending longitudinally between the tubes 126 and 128 are two partitions 132 bearing against the ring 129 at their upper ends and terminating at their lower ends at a short distance from the ring 130, whereby the heating chamber 131 is divided into two vertical sections with passageways therebetween at the lower ends of the partitions 132. The wall of the tube 60 has formed therein at its lower end, a pair of substantially semi-circular passageways or chambers 133 and 134, the former of which connects through a port 135 to the heating chamber 131 at one side of the partitions 132; and the latter connects through a port 136 to the heating chamber 131 at the opposite side of the partitions 132. An inlet pipe 137 is provided for the semi-circular passageway or chamber 134; and an outlet pipe 138 connects with the semi-circular passageway or chamber 133, whereby steam or other heating fluid can be passed from the pipe 137 through the semi-circular passageway or chamber 134, the port 136, the heating chamber 131, the port 135, and the semi-circular passageway or chamber 133 and out to the pipe 138.

A vertically movable tube 140 extends from a point above the bushing 125 downwardly through the bushing in sliding fit with the bore thereof and then downwardly in concentric spaced relation through the cylindrical passage 59 and through the concentric tube 128, terminating near the lower end of the latter. The tube 140 carries longitudinally extending spacers 141, which have a sliding fit with the inner surface of the tube 128. The tubes 128 and 140 and the lower end of the tube 126, which is formed as a short extension 142 are of special heat resisting metal, such for example as Monel metal, to which organic plastic material will not easily adhere. The extension 142 is beveled at its outermost end to form a concave conical bearing surface 143, such as is provided as the seat of a poppet valve. The movable tube 140 at its lower end carries a closure member 144 preferably of the same metal as the extension 142 and having a convexly conical bearing surface 145, which can be held in sealing relation against the bearing surface 143. Above the bearing surface 145 the closure member 144 has a vertical cylindrical portion 146 which has a sliding fit with the inner cylindrical surface of the extension 142. From the uppermost part of the portion 146, the closure member 144 tapers upwardly and inwardly to the movable tube 140. In like manner the outer or lower ends of the ring 130 and the tube 128 are conically concave to define between them and the upper part of the closure member 144, an annular, substantially frusto-conical passageway 147. This passageway opens upwardly into an annular cylindrical space 148 provided between the movable tube 140 and the concentric tube 128 and connected with the interior passage 59 of the tube 60, whereby there is provided a continuous conduit for plastic material from the channel 56 outwardly between the extension 142 and the closure member 144 when the movable tube 140 is moved downwardly in a manner and for purposes hereinafter described.

At its upper end the movable tube 140 is threaded into a longitudinal cylindrical cap 149 with a lock nut 150 to fix them in relative position and a spring bearing cup 151 beneath the lock nut 150. A compression spring 152, extending between the bushing 125 and the spring bearing cup 151, tends to move the movable tube 140 upwardly and thereby to hold the closure member 144 with its bearing surface 145 against the bearing surface 143.

Within the upper end of the movable tube 140 is sealed a spacing ring 153, in the inner surface of which is sealed the upper end of a tube 154. The tube 154 extends in spaced concentric relation downwardly through the movable tube 140, terminating beyond the lower end thereof. An annular closure 155 is sealed to the outer surface of the tube 154 at its lower end and extends outwardly in spaced relation below the inner portion of the closure member 144, but with its rim sealed thereinto, whereby to provide an annular heating chamber 156.

Into one side of the cylindrical cap 149 is threaded an inlet pipe 157, which connects through a port 158 through the wall of the movable tube 140 with the interior thereof. An opposite port 159 connects the interior of the tube 140 through the wall thereof with an outlet pipe 160. At right angles to the ports 158 and 159, Fig. 6a, a pair of diametrically positioned partitions 161 extend downwardly from the ring 153 almost to the annular closure 155, whereby to provide a divided inner heating chamber 162 through which a heating fluid may pass downwardly from the port 158 to the annular heating chamber 156 and thence upwardly to the port 159. Above the upper end of the tube 154, the cylindrical cap 149 has formed therein in a longitudinal port 163 which connects at its upper end with a transverse port 164. Into the outer end of the port 164 is threaded an elbow 165, Fig. 1, for the supply of pneumatic pressure for purposes and in a manner hereinafter described through the ports 164 and 163 and thence downwardly through the interior 166 of the tube 154, this tube being open at its lower end.

Seated with its lower end against and in a depression formed in the upper end of the cylindrical cap 149 is a thrust rod 170, which extends through a bearing 171. The bearing 171 is carried by an arm 172 extending outwardly from a vertical support 173, which is fixed on the top of the vertical standard 73. Extending upwardly from the vertical support 173 is a pair of spaced horizontal bearings 174, Figs. 2, 4 and 37, in which is journaled a rotatable shaft 175. Intermediate the bearings 174 on the shaft 175 is fixed a rocking lever 176, the outer end of which projects above the upper end of the thrust rod 170 and carries threaded therethrough an adjustable screw 177. The position of the screw 177 can be set and secured by a lock nut 178 on its upper end. On its inner end, the rocking lever 176 carries a downwardly projecting finger 179, Figs. 1, 37 and 39, bearing on a rotatable cam 180, which is fixedly mounted on the shaft 77, Fig. 5, between the bearings 76 and 76'. The finger 179 is held against the operating surface of the cam 180 by adjustment of the adjusting screw 177 and by the spring 152. The operating surface of the cam 180 comprises a shut-off section 181, Fig. 39, a bottom closure section 182 of predetermined height, a partial closure section 183 lower than the section 182 but higher than the section 181, and a side wall feed section 184.

Mold ring and severing means

Referring particularly to Figs. 1, 17, 18, 23 and 25, a top mold ring 185, closely fitting but slidably movable on the tube 126 of the nozzle, is curvedly beveled from its lower surface inwardly and upwardly toward the tube 126 to form a molding surface 186 extending through about 90°, with a shoulder 187 extending inwardly to the inside cylindrical surface 188 of the ring. At the lower extremity of the curved molding surface 186 is a shoulder 189 extending downwardly to a bottom horizontal annular surface 190 of the mold ring, outside which is a beveled or frusto-conical surface 191, for purposes hereinafter described. The mold ring 185 includes an upward cylindrical extension 192 somewhat larger in inside diameter than the diameter of the surface 188 and having an outside diameter smaller than the outside diameter of the lower part of the ring 185, there being formed an annular shoulder 193 which is stepped downwardly and outwardly to a second annular shoulder 194, against the latter of which rests the lower surface of a flange 195, Fig. 25, of a sleeve 196. The sleeve 196 is threaded onto the cylindrical extension 192 of the mold ring 185 and extends upwardly about and spaced from the tube 126. At its upper end the sleeve 196 has an inwardly extending flange 197, Fig. 18, the inner annular surface of which slides on the tube 126. By means of this sliding support, together with that afforded by the cylindrical inner surface 188 of the mold ring 185, the latter is guided in smoothly movable, non-binding relation on the outer surface of the tube 126. The shoulder 193 and the flange 195 define an annular cooling chamber 198, for which are provided an inlet pipe 199, Fig. 23, and an outlet pipe 200.

The sleeve 196 has formed thereon toward its upper extremity an outwardly extending annular portion 205, Figs. 4, 18 and 28, which carries diametrically opposed and aligned journal bosses 206 on the outer ends of which are pivoted a pair of slide blocks 207. The slide blocks 207 are received in the slotted ends of a pair of yokes 208, which extend from and are fixedly mounted to a horizontal shaft 209, Figs. 1 and 2. The shaft 209 is rotatably mounted in a pair of forwardly extending brackets 210, which are mounted in fixed relation at the lower end of the forward surface of the support 73. On its outwardly projecting end, Figs. 2 and 4, the shaft 209 carries fixed thereto a backwardly extending bifurcated arm 211, which carries pivoted thereto a block 212. The block 212 is slidable on a rod 213, which at its lower end carries a compression spring 214 bearing at its upper end against the lower surface of the block 212 and at its lower end against a nut 215 secured to the lower end of the rod 213 by suitable means. In slidable relation over the major portion of the length of the rod 213 is a tube 216 bearing at its lower end against the upper surface of the block 212 and at its upper end against an adjusting nut 217. Against the nut 217 is a lock nut 218, the nuts 217 and 218 being located a short distance below the upper end of the rod 213. A clevis 219 threaded onto the uppermost end of the rod 213 is pivotally connected to an intermediate point of a lower arm 220 of a bell crank 221, which is pivotally mounted on the adjacent bearing bracket 76'. At its outer end the lower arm 220 carries one end of a tension spring 222, the opposite end of which is fixed to the vertical standard 73, whereby it tends to move the rod 213 and the arm 211 downwardly and the yokes 208, the sleeve 196 and the top mold ring 185 upwardly. The upper arm 223 of the bell crank 221 carries a roller 224, Figs. 2, 37 and 38, which bears against the working surface of a cam 225. The cam 225 is fixed to the outer end of the shaft 77 and has a raised surface 226 which, upon rotational movement, serves through the parts described to lower the top mold ring 185 on the tube 126.

End-forming divided cup mold

On its lower end, Figs. 1, 2, 3 and 4, the support 73 carries a C-shaped bracket 230, which has its open face forward and which carries between its upper and lower members a fixed vertical shaft 231. The shaft 231 supports for rotational movement thereon an upper sleeve 232 and a lower sleeve 233 from which extend respectively arms 234 and 235. These arms carry, respectively, cup mold halves 236 and 237, which are aligned and are movable apart with their respective arms and sleeves and may be brought together to form a cup mold 238, Figs. 19 and 20, hereinafter more fully described. The upper sleeve 232 at its upper end carries fixed thereto a downwardly facing bevel pinion 240; and the lower sleeve 233 at its lower end carries fixed thereto an upwardly facing bevel pinion 241. In its vertical portion the C-shaped bracket 230 has journaled therein a horizontal shaft 242, which at its forward end carries a driving bevel gear 243 meshing with the bevel pinions 240 and 241 and having fixed thereto an arm 244, which extends laterally, to the left as seen in Fig. 4. At its outer end the arm 244 carries a swivel connection 245, Fig. 3, suitably connected to a clevis 246, through which extends a connecting rod 247 carrying at its lower end a head 247' bearing against the inner surface of the clevis 246. At its upper end the connecting rod 247 carries a second clevis 248 connected to a swivel member 249 which pivots on the outer end of a backwardly extending arm 250 of a bell crank 251 mounted near the bottom of the bearing bracket 76. An upwardly extending arm 252 on the bell crank 251 carries a roller 253, Figs. 3 and 42, which bears beneath and against the working surface of a cam 254, having a raised portion 254', fixed on the shaft 77 outwardly from the bearing 76. A forwardly extending arm 255 on the bell crank 251 is connected through a tension spring 256 to the support 73, whereby the spring 256 tends to hold the mold cup halves 236 and 237 in their open position. Around the connecting rod 247 is a concentric sleeve 257, the lower end of which bears against the upper end of a compression spring 258 bearing at its lower end against the upper end of the clevis 246. At its upper end the sleeve 257 bears against an adjusting nut 259 threaded on the rod 247 near its upper end, with a lock nut 260 above it.

Referring now particularly to Figs. 1, 3, 18, 19, and 20, the cup mold 238, comprising the cup mold halves 236 and 237, when the latter are in closed relation, has an upper cylindrical bore 265 which is the same diameter as the outside of the tube 126, whereby the mold 238 can be closed about the lower end of the tube 126 in sealed relation thereto and with the two halves 236 and 237 in sealed relation. From the lower edge of the bore 265 the two halves of the cup mold 238 have under-cut shoulders 266 from which the surfaces extend downwardly and inwardly to define a shallow cup-shaped surface 75

267 which, in the closed position of the cup mold halves 236 and 237 about the lower end of the tube 126, conforms to and is substantially parallel with and spaced below the lower surface of the annular closure 155, with the lower end of the innermost tube 154 positioned centrally above the surface 267. The depth of the cup mold 238 is such that its inner surface is also spaced below the annular closure 155 when the latter is in its open position, Fig. 20, that is, at its lowest position as moved with the tubes 140 and 154 by the cam 180.

*Blowing pressure control, Figs. 1, 2, 5, 21, 33, 37, 40 and 41*

From the elbow 165, Fig. 1, a flexible hose 270 extends upwardly and connects with the outlet port 271, Fig. 5, of a manifold 272, which is mounted above the shaft 175 and is fixed on arms 273 carried by the bearings 174. Within the manifold 272, but not shown, are a high pressure valve having a forwardly extending inlet port 274, Figs. 5 and 37, and a backwardly extending valve stem 275, and a low pressure valve having a forwardly extending inlet port 276, and a backwardly extending valve stem 277. From the ports 274 and 276 there extend conduits 278 and 279, respectively, to sources of high and low pressure air. On the shaft 175, Fig. 37, between the bearings 174 and adjacent to the rocking lever 176 are rotatably mounted a pair of bell cranks 280 and 281, Figs. 37, 40 and 41, the former with its upper arm in actuating relation to the valve stem 275 and the latter in actuating relation to the valve stem 277 and with their backwardly extending arms respectively in operative contact with cams 282 and 283. These cams are fixed on the shaft 77 between the bearings 76 and 76', and adjacent to the cam 180, the shape, function and operation of the cams being hereinafter more fully described.

*Molds-mounting and moving means*

Referring particularly to Figs. 1a, 1b, 3 and 4a, beneath the horizontal casing 22 the base 69 carries a pair of upwardly extending guides 290, Fig. 4a, above and aligned with which are a pair of guides 291 formed on brackets 292 secured to the vertical standard 70. In the guides 290 and 291 there is mounted for vertically sliding movement a pair of slides 293, at the top of which is secured a transverse table block 294. Below the table block 294 and extending in fixed relation between the slides 293 is a shelf 295, which has a forward projection 296 and a backward projection 297. Fixed to and downwardly depending from the projections 296 and 297 are, respectively, bearing brackets 298 and 299, in which is journaled a shaft 300. The shaft 300 immediately back of the bearing 298 carries fixed thereto a Geneva gear 301, which has formed therein in its forward face four slots 302 spaced 90° apart. Immediately forward of the bearing bracket 299 the shaft 300 carries a bevel gear 303 fixed thereto. Between the Geneva gear 301 and the bevel gear 303 and loose on the shaft 300 is a sleeve 304, Fig. 1a. The sleeve 304, at its respective ends, abuts in bearing relation against the Geneva gear 301 and the bevel gear 303. Projecting horizontally outwardly in opposite directions from the sleeve 304 is a pair of bosses 305, which carry the upper clevis 306 of a two-part link 307, the lower part 308 of which is pivoted to the forward end of a rocker arm 309. The rocker arm 309 extends backwardly through the hollow vertical standard 70 and has intermediate its ends a bearing 310, which is journaled on a transverse shaft 311 extending between and carried by eccentrically adjustable bearings mounted in the sides of the hollow standard 70. At its rear end the rocker arm 309 carries a roller 312, Figs. 1b and 36, which bears against a table raising cam 313, this cam having a raised section 314 and being fixedly mounted upon the shaft 120.

The table block 294 on its upper surface carries at each end thereof spaced pairs of guide gibs 315, Fig. 15, which receive for transverse movement a pair of guides 316 fixed to the under side of a table 317. The table 317 extends both in length and width beyond the table block 294 and has formed in its lower surface a forwardly and backwardly extending slot 318, Figs. 14 and 16, in which slidably fits a block 319. Pivoted to the block 319 is a horizontal crank arm 320 which is fixed to a shaft 321 extending downwardly centrally through and journaled in the table block 294 and the shelf 295, Figs. 1a, 14, 15 and 16. Beneath the shelf 295 the shaft 321 carries fixed thereto a bevel pinion 322 which meshes with and is driven by the bevel gear 303.

Below and backwardly from the shaft 311, Figs. 1a and 1b, a shaft 325 extends transversely within the hollow standard 70, being journaled in a pair of bearings 326. Between the bearings 326 and fixed on the shaft 325 is a sprocket 327 connected through a chain 328 to a driving sprocket on the main drive shaft 120, Fig. 5. A bevel gear 330, Fig. 1a, fixed on the shaft 325 meshes with a bevel gear 331 which is fixed on a forwardly extending shaft 332 journaled in a rear bearing 333, mounted within the hollow vertical casing 70, and a forward bearing 334, mounted on the base 69 forwardly of the vertical guides 290. Immediately behind the bearing 334 the shaft 332 carries a Geneva driving disc 335 which has fixed thereto a backwardly extending crank pin 336. The crank pin 336 is in operative relation to engage successively each of the slots 302 in the Geneva gear 301, whereby, through the mechanical train from the shaft 300 to the block 319 in the slot 318, the table 317 is moved alternately from left to right and from right to left in successive timed movements. As more fully hereinafter described, it will be seen that the lateral movement of the table 317 will occur only during the time the rocker arm 309 has carried the table 317 and the Geneva gear 301 downwardly to its lowermost position.

*Molds-opening and closing means, Figs. 1a, 2 and 9 to 16*

A shelf 340, Fig. 1a formed on the forward part of the hollow vertical standard 70 adjacent to the table 317, carries laterally spaced box casings 341 and 342, Fig. 9. At the backs of the box casings 341 and 342 respectively, there are carried bearings 343 and 344, Fig. 10, in which is journaled a shaft 345. On its outwardly extending end, on the left as seen in Fig. 4a, the shaft 345 carries a sprocket 346, Fig. 3, which connects through a chain 347 to a sprocket 348 fixedly mounted on the outer end of the shaft 120.

On the shaft 345 adjacent to the bearing 344 is fixed a short helical gear 350, Figs. 10 and 11, which engages a complementary helical gear 351 fixed on a shaft 352 which extends forwardly and is journaled in bearings formed in the back and front walls of the box casing 342. Within the casing 342 the shaft 352 carries near its forward end a Geneva gear 353 which has four equally spaced driving slots 354, Fig. 9, and intermediate equally spaced locking surfaces 355. The Geneva gear 353 is free to rotate on the shaft 352 and has fixed thereto for rotation therewith about the shaft 352 a toothed gear 356. Within the casing 342 and backwardly from the Geneva gear 353 the shaft 352 carries a gear 357 back of which and adjacent thereto is a smaller gear 358, both fixed on the shaft 352. The gear 358 meshes with a gear 359 fixed on a shaft 360 which extends directly above and parallel to the shaft 352 and is journaled in the forward and rear walls of the casing 342. Immediately forward of the gear 359 on the shaft 360, but free to rotate on the latter, is a gear 361, which carries fixed thereto a pair of diametrically opposed radially extending arms 362, each having thereon an enlarged portion 363. The portions 363 have formed thereon cam surfaces 364, Fig. 9, which are in substantially the form of portions of helical spirals or screws. The ratio of the gears 357—361 and 358—359 is such that for each six revolutions of the gear 359, the gear 361 will make seven revolutions, so as to cause one or the other of the cam surfaces 364 to pass a given point relative to the gear 359 at the end of each third revolution thereof.

Fixed on the shaft 360 in operative relation above the Geneva gear 353 is a complementary Geneva disk or driving gear 365, which has a concentric lateral surface 366, Fig. 9, extending through an arc of 270° and of a radius to have a sliding fit with the locking surfaces 355 of the Geneva gear 353, and through an arc of 90° has a concave surface 367 which is cut on a radius to permit movement of the Geneva gear 353. Fixed to the disc 365 on the face toward the arms 362 and extending radially therefrom adjacent to the mid-portion of the concave surface 367 is the pair of lugs 368, which support a pivot pin 370 for an arm 369 arranged to swing in a plane radial of the shaft 360. A slot 371, Fig. 11, is formed in the arm 369 at its pivotal portion to receive a spring 371a positioned about the pin 370 and having one end held to the hub of the disc 365 and the other end held by the arm 369 so as to tend to move the arm 369 away from the general plane of the Geneva gear 353 and toward the position indicated in dotted lines in Fig. 11. Through the outer end of the arm 369 is threaded a stud 372, which on the side toward the Geneva gear 353 carries a roller 373 adapted to be moved by the arm 369 into engaging relation successively with each of the slots 354 of the Geneva gear 353. Projecting in the opposite direction from the roller 373 is a pin portion 374 of the stud 372, which is arranged to be engaged alternately by the cam surfaces 364 during the conjunction of these parts as aforesaid, whereby the roller 373 is moved into engaging relation with one of the slots of the Geneva gear 353. The cam surfaces 364 will thus alternately engage the pin portion 374 once for every three complete revolutions of the gear 358.

In the box casing 341 is a gear train and Geneva movement mechanism similar to that above described for the box casing 342, except that the above described parts in the box 342 are at a higher elevation than those in the box 341, for a purpose hereinafter set forth, corresponding parts being indicated by the same reference characters.

Through the box casing 342 directly beneath and parallel to the shaft 352 extends a shaft 376 which carries fixed thereto a pinion 377 in mesh with the gear 356. At its opposite end and within the box 342 the shaft 376 carries a forwardly facing bevel gear 378 which meshes with a bevel gear 379 fixed on a horizontal shaft 380. The shaft 380 passes through a bearing 381, Fig. 9, in the side wall of the box casing 342 and extends at right angles to the shaft 376 to the proximity of the box casing 341, where it is journaled in a second bearing 382, Fig. 10. Beyond the bearing 382 the shaft 380 carries a bevel gear 383 which meshes with a forwardly facing bevel gear 384 fixed to a shaft 385 parallel to the shafts 352 and 376.

Near its forward end the shaft 385 is journaled in a bearing 386, forwardly of which an arm 387 is fixed on the shaft 385. The arm 387 carries a forwardly extending pin 388 on which turns a roller 389 for closing and locking a mold as hereinafter described. To the rear of the bevel gear 384 the shaft 385 is journaled in a bearing 390. On the forward end of the shaft 376, outside the casing 342 and adjacent to the pinion 377, is fixed an arm 391, which extends in the same radial direction as the arm 387 and which carries extending forwardly therefrom a pin 392 provided with a roller 393 for closing and locking another mold as hereinafter described. The rollers 389 and 393 are substantially in a common vertical plane and are spaced at substantially equal distances from the centers of their respective shafts 385 and 376. Also the train of gears from the pinion 377 to the shaft 385 are predetermined so that the shafts 376 and 385 have equal rotational movement.

On the backwardly extending shaft 352 of the box casing 341 is mounted a helical gear 395, Figs. 10 and 12, which meshes with a helical gear 396 keyed to the shaft 345. The ratio of the pitch diameters of the helical gears 395 and 396 is the same as the ratio of the pitch diameters of the helical gears 351 and 350 of the box casing 342. Through the box casing 341 and directly beneath and parallel to the shaft 352 thereof there extends a shaft 397 which, on its forward end outside the box casing 341, carries a radial arm 398. The arm 398 at its outer end carries a forwardly extending pin 399 on which is rotatably mounted a roller 400 for unlocking and opening the mold which the roller 389 closes and locks. Within the box casing 341 the shaft 397 carries fixed thereto a pinion 401, Fig. 12, directly beneath and in driving relation to the gear 356 therein. Outside the box casing 341 and at the rear thereof the shaft 397 carries a helical gear 402 which meshes with a complementary helical gear 403 fixed on a horizontal shaft 404. The shaft 404 extends through a bearing 405, Fig. 10, on the box casing 341 to and through a bearing 406 on the box casing 342 and therebeyond carries a helical gear 407, Fig. 9, which meshes with a complementary helical gear 408 fixed to a forwardly extending horizontal shaft 409 which is journaled in bearings 410 extending outwardly and laterally from the box casing 342. The helical gear 407 is opposite in pitch angle to the helical gear 402 so that the shafts 397 and 409 will be rotated in opposite directions. At its forward end the shaft 409 carries fixed thereto an arm 411 which at its outer end carries a forwardly extending pin 412. On the pin 412 is rotatably mounted a roller 413 for unlocking and opening the mold which the roller 393 closes and locks. The rollers 400 and 413 are substantially in a common vertical plane and are spaced substantially equal distances from the centers of their respective shafts 397 and 409. Also the train of gears from the pinion 401 to the shaft 409 are predetermined so that the shafts 397 and 409 have equal rotational movement.

Further, the rollers 400 and 413 are in a common vertical plane with the rollers 389 and 393. All these rollers are spaced apart at substantially equal distances from the centers of the shafts 376, 385, 397 and 409. By the arrangement of the parts above described, all these shafts have equal arcuate rotation for each step of their actuation by the corresponding Geneva movement, that is through an arc of 360° at each step. The roller 389 with its arm 387 rotates in a counterclockwise direction at the same time that the roller 393 rotates with its arm 391 in a clockwise direction, after which both are located in a predetermined position by the Geneva locking disc 365 in the box casing 342. At another time the roller 400 with its arm 398 rotates in a clockwise direction simultaneously with the counterclockwise movement of the roller 413 with its arm 411, after which both come to rest at a predetermined position. During the time of rest the concentric surfaces of the Geneva discs 365 ride through one of the locking surfaces 355 of the corresponding Geneva gear 353 in the respective casings 341 or 342.

Beneath the end of the table 317 adjacent to the box casing 341 there depends a pair of bearings 420, Fig. 4a, through which extends a shaft 421 carrying near its forward end a bevel gear 422, Fig. 13, and near its backward end a bevel gear 423. The bevel gear 422 meshes with a bevel pinion 424 fixed to a shaft 425 which extends horizontally underneath the forward edge of the table 317 and is journaled in a pair of bearings 426. Intermediate its ends the shaft 425 carries a pinion 427 which meshes with a rack 428 movable horizontally with a backward and forward motion in a slot 429 cut through and extending for a distance inwardly from the forward edge of the table 317. The upper face of the rack 428 is substantially parallel with the upper surface of the table 317 and carries fixed thereto a slide 430, the shouldered longitudinal sides of which are guided by undercut guides 431. In a similar arrangement beneath the rear edge of the table 317 the bevel gear 423 drives a bevel pinion 435 secured to a shaft 436, which also carries a pinion 437 that drives a rack 438, Fig. 15. The rack 438 is aligned with the rack 428 and is oppositely movable therewith in a slot 439 aligned with the slot 429. The rack 438 carries fixed thereto a slide 440 which moves in guides 441. At its rearward end, projecting beyond the table 317, the shaft 421 carries a yoke 442 fixed thereto in operative relation to straddle the rollers 389 or 400 and to be actuated thereby respectively at different positions of the table 317 in a manner and for a purpose hereinafter set forth.

At the opposite end of the table 317 a shaft 445 similar to the shaft 421, actuates a bevel gear and pinion 446, a shaft 447, a pinion 448, a rack 449 and a slide 450, which latter rides between guides 451. Under the rear edge of the table 317 the shaft 445, through a bevel gear 452 and a pinion 453, drives a shaft 454, a pinion 455, a rack corresponding to the rack 438 and a slide 457, the lateral edges of which latter move in guides 458. A yoke 459, similar to the yoke 442 is in operative relation to be engaged by the rollers 393 and 413 and thereby to be actuated as hereinafter described.

*Mold construction and temperature control*

The slides 430 and 440, which comprise a cooperative pair, carry respectively two side mold halves 464 and 465, Figs. 13, 14 and 15, by means of upwardly extending brackets 466 and 467 respectively, which hold the mold halves 464 and 465 positioned at a predetermined distance above the table 317 and also above the pairs of guides 431 and 441, respectively. Between the mold halves 464 and 465 and horizontally aligned therewith a mold bottom 468 rests on the table 317 with a pin 469 depending therefrom and extending through a corresponding opening in the table 317 for securing the bottom 468 against movement horizontally. The mold halves 464 and 465 are formed with hollow walls to define cooling chambers 470 and 471 respectively, Figs. 13 and 23, which latter are provided with the pairs of inlet and outlet pipes 472, 473 and 474, 475 respectively.

The top annular surface 476, Fig. 26, of the mold halves 464 and 465, when they are in the closed position is operative to receive the annular surface 190, Figs. 17 and 23, of the top mold ring 185 with the inside diameter of the annular surface 190 and that of the top annular surface 476 equal to each other, for the purpose hereinafter described. Referring particularly to Fig. 23, the assembled mold as herein particularly illustrated comprises the top mold ring 185, the side mold halves 464 and 465 and the mold bottom 468 and provides a mold cavity having a flat circular bottom 480, sides which are substantially in the form of a cylinder 481, for a distance from the top of which they slope upwardly and inwardly to a short cylindrical portion 482 at which is formed an annular groove 483. Above the groove 483 there is a curved outward flare 484 at the top of which there is a shallow vertical shoulder 485 in the mold halves 464 and 465 adjacent to the top annular surface 476 and registering with the annular shoulder 189, Fig. 17, of the top mold ring 185. The outer diameter of the top annular surface 476 is the same as the outer diameter of the annular surface 190 of the top mold ring 185. A frusto-conical surface 486, flaring upwardly and outwardly from the outer circumference of the top annular surface 476, is made to fit the frusto-conical surface 191 of the top mold ring 185, whereby the latter is centered on the mold when the two are brought together as hereinafter described.

The slides 450 and 451 carry respective side mold halves 464' and 465', similar to the side mold halves 464 and 465 on the slides 430 and 440, with the mold bottom 468' similarly arranged on the table 317 between the mold halves.

A flexible conduit 490, Figs. 13 and 33, connects from a water supply pipe 491 to the inlet pipe 472, Fig. 23. A flexible conduit 492 connects the outlet pipe 473 to an inlet pipe 473' of the other mold, Figs. 1a and 13. A flexible conduit 493 connects an outlet pipe 472', Fig. 4a, to a discharge pipe 494. In a similar manner at the rear halves of the molds 465 and 465' a series of pipes and flexible conduits, including pipes 490', 492' and 493', Fig. 13, connect from a source of cooling liquid through the cooling chambers of the mold halves to a discharge pipe.

Molds-locking means and operation thereof

Aligned in operative relation with the arm 387 and the roller 389, Fig. 9, to be actuated thereby at a given position of the table 317 as hereinafter described, is a yoke 500, Figs. 13 and 14 which is in operative relation to be engaged by the rollers 389 and 400 to lock or unlock a mold as hereinafter described. The yoke 500 is fixed to the rearwardly extending end of a shaft 501 which is journaled in bearings 502 fixed to the table 317 adjacent to the mold halves 464 and 465. Fixed on the shaft 501 between and respectively adjacent to each of the bearings 502 is a pair of clamp arms 503, each of which carries at its outer end an enlarged inclined face 504 operatively arranged to be moved into and out of clamping engagement with the outer inclined surfaces respectively of the brackets 466 and 467, whereby movement of the yoke 500 by the arm 387 and the roller 389 will move the clamp arms 503 to bring the contact portions 504 into wedging engagement with the inclined brackets 466 and 467 to hold the mold halves 464 and 465 in sealed engagement when the mold is in the closed position and to release the brackets 466 and 467 from the inclined surfaces 504 when the arms 503 are moved in the opposite direction by a corresponding movement of the yoke 500 by the arm 398 and the roller 400. At its inner end each of the arms 503 carries an outward projection 505, Fig. 14, adapted to limit the opening movement of its respective arm at the vertical position by engagement with the surface of the table 317.

Similarly, a yoke 506 arranged in operative relation to the rollers 393 and 413 is operative to lock and unlock a mold through a shaft 501′, clamp arms 503′ and inclined surfaces 504′, so as alternately to hold the mold halves 464′ and 465′ in sealed relation and to release the latter for opening movement as hereinafter described.

Neck finishing means

Referring particularly to Figs. 2, 26, 27 and 28, each of the brackets 210 carries on the outer sides of its forward end a vertical boss 510 having a vertical bore 511 therethrough with an annular inwardly extending shoulder 512 at its upper end. Within the bore 511 at the lower end thereof is positioned a vertically extending slide rod 513, which at its upper end has fixed thereto a pin 514 extending upwardly through and beyond the vertical boss 510 and carrying on its outer end a nut 515. Within the bore 511 the pin 514 carries a compression spring 516 which bears at its upper end against the shoulder 512 and at its lower end against the upper end of the slide rod 513. At its lower end the slide rod 513 carries a horizontal annular disc 517 which is formed with a vertical cylindrical surface 518, Fig. 26, of a diameter substantially equal to the diameter of the shoulder 485 of the closed mold halves 464 and 465. From the cylindrical surface 518 the lateral surface of the disc 517 is curved inwardly and downwardly to define a molding surface 519 which corresponds and is complementary in shape to the outward flare 484 of the assembled mold halves 464 and 465, but of a smaller diameter at each of the corresponding points. The pair of discs 517, one on each side of the brackets 210, are operatively arranged and adapted to register respectively with the molds formed by the pairs of mold halves 464—465 and 464′—465′, when the latter are successively brought into registry therebeneath and moved upwardly thereto in the manner and for the purposes hereinafter set forth.

Molds—venting means

Referring particularly to Figs. 31 and 32 there is shown one of the preferred forms of the mold halves 464 and 465 in which the abutting longitudinal faces 530 and 531 thereof have formed therein longitudinal grooves 533 at positions between the inner and outer edges of the faces 530 and 531 and connecting at their lower ends with ducts 534, which extend downwardly and inwardly into the mold bottom 468 where they connect with a transverse duct 535. The duct 535 is closed at one end and at its opposite end is connected through an elbow 536 with a valve 537 which is arranged to regulate the rate of flow of air outwardly from the grooves 533, the ducts 534 and 535 and the elbow 536 to the atmosphere. At their upper ends the mold halves 464 and 465 have grooves 532 which register and connect with the upper ends of the grooves 533 and are closed over by the annular surface 190, Fig. 17, of the mold top ring 185. The mold bottom 468 has a key 540 which fits into corresponding grooves in the mold bottom pin 469 and the table 317 to hold the mold bottom 468 against rotational movement. The faces 530 and 531 are relieved at their inner portions at 530′ and 531′ so that the mold, which is otherwise substantially air tight, has a restricted passageway between the mold cavity thereof and the ducts 533, whereby air trapped between an expanding plastic article and the walls of the mold cavity is retarded in its flow outwardly to the atmosphere through the grooves 533 and the ducts 534 and 535 by the valve 537. In some cases the relief of the surfaces 530′, 531′ may be made small enough so that the retarding of the flow of the trapped air can be accomplished without the aid of the valve 537, according to the size of the mold, the rate of expansion of the article being blown and other factors herein inherently involved. The trapping of the air in the manner above described tends to retard the expansion and distension of a hollow article being blown in the mold and thereby tends to prevent the blowing out of the plastic material in spots and to prevent the forming of thin places therein and tends to keep the distending wall substantially uniform in thickness at corresponding parts of the article being blown.

Operation of the machine

Referring now to the drawings and to the above description of the illustrative example of the present invention shown by the drawings, a summary description will first be given of a cycle of steps through which the table 317 and some of the parts carried thereby pass, after which a general detailed description of the operation of the whole machine will be given.

Fig. 34 is a flow sheet diagrammatically showing various steps in the operation of parts on the table 317 and the various positions of the table during the operation of said steps. In this flow sheet, position 1 shows the table 317 at its upper position as raised by the cam 313, Figs. 1b and 36, through the rocker arm 309, it being understood that the table 317 is moved vertically between two levels, an upper level and a lower level, and is movable laterally to two limits, one to the right and one to the left, whereby there are four definite positions in which the table 317 stops. One of these positions, indicated as position 1 in Fig.

34, is at the upper level and to the left, in which the mold halves 464' and 465' are under and aligned with the tube or nozzle 126, the mold being closed and locked in operative relation thereto with an extrusion of plastic material from the tube 126 extending thereinto, having a tubular shape and a closed lower end ready to be expanded against the inner surface of the mold. At the latter stage of this operation the mold is entirely closed with the mold top ring 185 held in position firmly against the top of the mold. At this stage the mold 464—465 is closed and locked with a formed bottle therein held against the molding surface 519, Figs. 26 and 28, by means of which that portion of the extrusion which is formed against the molding surface 186 of the mold top ring 185 is reversed and laid against the surface of the mouth of the bottle formed on the outwardly flaring surface 484. Reference is here made to Fig. 36 which shows cyclically the succession of steps which appear in Fig. 34 in two cycles, one cycle for the left hand mold (464—465) and the other cycle for the right hand mold (464'—465'). Reference is also made in Figs. 37 and 38 to 42 which show details and relative positions of the cams 180; 225, 254, 282 and 283, each of which is adjustable to control the effective length of each of its raised surfaces.

In position 2, Fig. 34, the table 317 is at the lower level, but still to the left limit laterally. In this positon of the table 317 the closed mold 464'—465' contains a bottle which has just been blown and on which the molded portion formed against the molding surface 186 extends upwardly beyond the portion which becomes the lip of the bottle; and mold 464—465 contains a previously molded bottle with the portion formed against the molding surface 186 reversed to form the mouth and lip thereof. In this position both molds are closed and locked.

In position 3 the table 317 is still in its lower position and to the left, with the mold 464'—465' still closed and locked with the molded bottle therein still in the same condition as in positiqn 2. The mold 464—465 has been unlocked and opened, and in this position a completely formed bottle is removed therefrom.

In position 4 the table 317 is still at the lower level, but has been shifted to the right hand position. Here the molds are in the same state as in position 3, that is the mold 464—465 is open and empty and the mold 464'—465' is closed and locked with a formed bottle therein, the mouth of which still needs the operation of reversing the projecting portion thereof against the molding surface 519 of the disc 517 at the right as seen in Fig. 28 and immediately above it. During movement to position 4, the cup mold halves 236 and 237 close about the end of the tube 126; the annular closure 155 moves to its full open position under control of the section 182 of the cam 180; and plastic material is extruded from the tube 126 to form a closed bottom end for the tubular extrusion of plastic material which is to be further extended. The annular closure 155 then moves up to the partially closed position under control of the cam section 183, Fig. 39, and the cup mold halves 236 and 237 move back into their opened position.

Also after movement of the table 317 to position 4, the annular closure 155 again opens to its full open position under control of the section 184 of the cam 180; and the extrusion is continued for the forming of the side walls of the extrusion. Simultaneously with the action of the cam section 184 to open the annular closure 155, the raised section 283', Fig. 41, of the cam 283 actuates the low pressure valve stem 277 to admit low pressure air into the extrusion being formed. The mold halves 464 and 465 are still in their open positions.

The table 317 is then raised to position 5.

In position 5 the table 317 has been raised to the upper level and is still positioned to the right. During the raising to this position, the portion of the bottle in the mold 464'—465' which extends upwardly from the mouth thereof has come into contact with the molding surface 519 of the disc 517 seen at the right in Fig. 28 and has been reversed thereby into the mouth of the bottle. Between the open mold halves 464 and 465 the extrusion is still continued with low pressure air being applied thereinto.

In position IA the table 317 is still at the upper level and to the right, and extrusion under low air pressure continues to completion, after which the mold halves 464 and 465 are moved into their closed position against the mold bottom 468 and locked about the tubular extrusion which is nearing completion. Thereafter the top mold ring 185 moves downwardly into position against the top of the mold 464—465; the low pressure air is cut off; and high pressure air is applied to expand the extrusion against the walls of the mold.

The table 317 is then moved downwardly to position 2A still to the right. During this downward movement, the mold top ring 185 follows the mold 484—485 downwardly to bring the lower edge of its inside cylindrical surface 188, Fig. 17, below the end of the tube 126 and the head 155 and thereby to sever the extruded and expanded part of the plastic material from the parent body of the material in the tube 126. The top mold ring 185 then returns to its uppermost position, completing the return shortly before the time table 317 reaches position 3A.

In position 3A no change takes place with mold 464—465 or the article contained therein; but the mold 464'—465' is opened and a completely formed bottle is removed therefrom.

The table 317 then shifts to its left hand position, but remains at the lower level, position 4A. The mold 464—465 remains closed and locked with the bottle therein ready to have its upper projection reversed and the mold 464'—465' remains open. During the shift from position 3A to 4A an end is formed in the cup mold halves 236 and 237 after which side wall extrusion commences as in position 4.

The table 317 is then raised into position 5A (at the upper level and to the left) where the projection from the mouth of the bottle in the mold 464—465 is reversed by the molding surface 519 at the left as seen in Fig. 28; and the side wall extrusion is continued down to the desired position between the open mold halves 464' and 465', whereupon the cycle is completed and then repeated as above described.

In the use and operation of the machine above described for forming a bottle such as is illustrated in Fig. 30 from organic plastic material, in a continuous cycle of operations, the steps can be described generally as follows:

Commencing with a quantity of suitable organic plastic material which in some instances is thermo-plastic and has the characteristic of becoming plastic under the simultaneous application thereto of heat and pressure and of being hard and strong in the cold state and of being substantially transparent in a thin film or in a thickness of about ⅛ inch, a quantity of such a plastic material in the cold state and in a pulverized form is fed into the hopper 10 of the feeder 9. The machine is set in continuous motion through the driving motor, not shown, but described as being connected to the driving chain 122; cooling fluid is circulated through the cooling jacket 13; and heating fluid is circulated in the heating jacket 24, Figs. 7 and 8.

Figure 8:
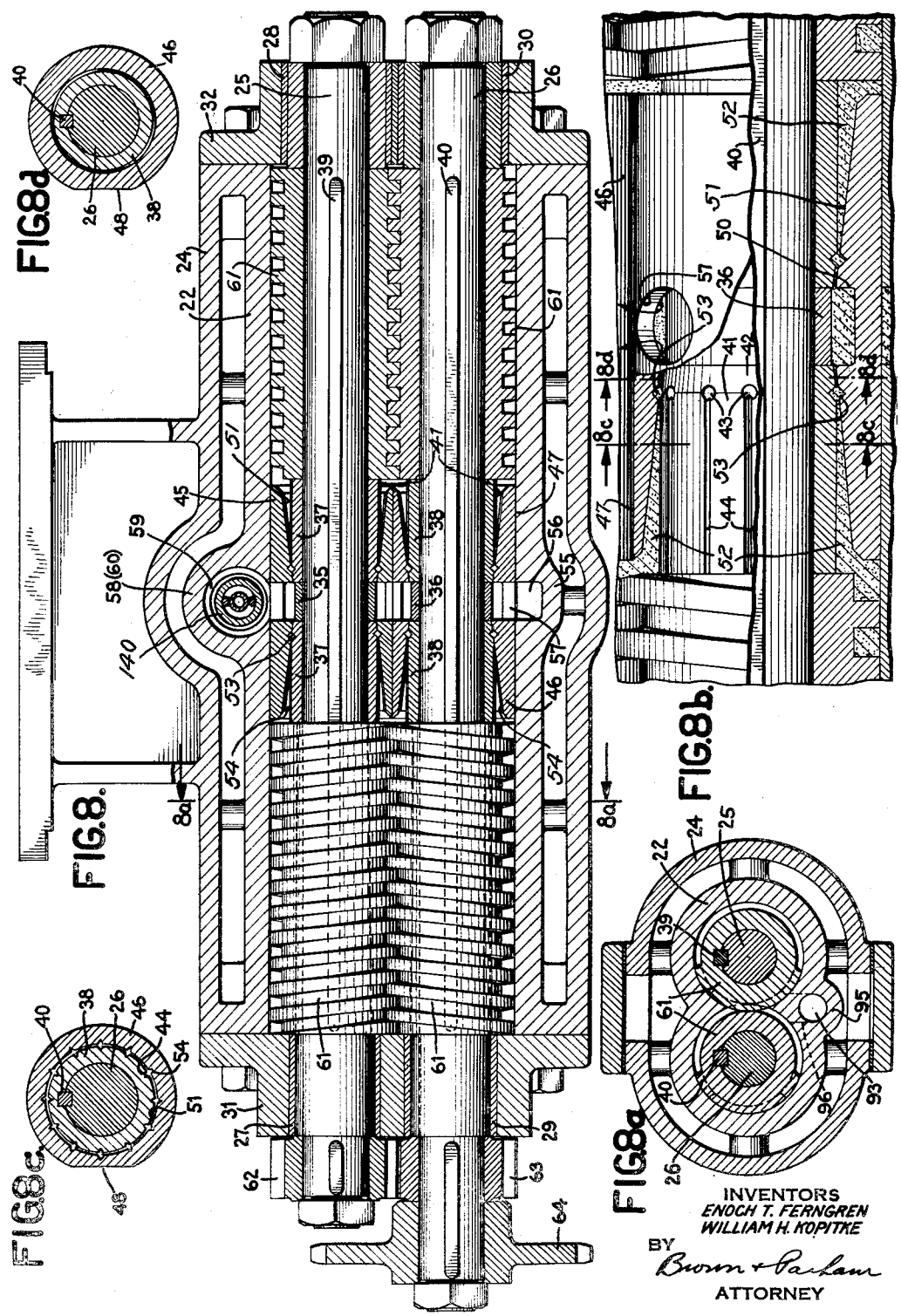
Fig. 8 is a view in horizontal section on the line 8—8 of Fig. 1, of part of the plasticating and feeding mechanism of Fig. 7.

The dual screw 11, Fig. 8, will feed the pulverized plastic material continuously in two substantially equal streams to the discharge ducts 12, Fig. 4, from which it will drop into the inlet ducts 23 and on to the square-cut screws 61, Figs. 7 and 8, where it will be heated by means of the heating jacket 24, Fig. 1, to a temperature at which it will be plastic under pressure.

The pressure will be produced when the plastic material, through being fed by the square-cut screws 61 passes between the sleeves 37 or 38 and the outer sleeves 45 or 46 between their inward ends where the passages are very small, in the order of a few ten thousandths to a few thousandths of an inch radially.

During its passage between the sleeves 37 or 38 and the outer sleeves 45 or 46 any extraneous matter such as will not become plastic under heat and pressure will be further ground and pulverized by the edges of the grooves 44 and 54 and the depressions 43 and 53. At this time the substantially constant steam pressure in the cylinder 90, Fig. 7, will hold the piston 97 in its upper position in which the ports 92 are closed, and the plastic material having passed through the outer sleeves 45 or 46 under the high pressure will flow as a homogeneous plastic mass into the circumferential channel 56 and into the cylindrical passage 59 (tube 60), Figs. 1 and 6, whence it will flow downwardly between the inner tube 128 and the movable tube 140 and into the frusto-conical passageway 147 where it will be stopped by the annular closure 155. If the closure 155 is not open when the supply of the plastic material has accumulated in the circumferential channel 56, pressure will be built up therein and in the cylinder 90 until it exceeds the pressure of the steam below the piston 97, whereby the latter is forced downwardly against the steam pressure until the ports 92 are opened sufficiently to by-pass the plastic material through the passageways 93 and ports 96 back to the receiving end of the square-cut screws 61, where it will be recirculated with the incoming plastic material in the cold pulverized state.

Referring to Fig. 34 and to other figures, for the blowing of a bottle with the plasticated organic plastic material, the table 317 is in position 4A; the mold halves 464' and 465' are in their open position, at the left and at the lower level, and are centrally located below the tube 126, when the bottom closure feed section 182 of the cam 180, Fig. 39, rotates into contact with the finger 179, the pressure rod 170 will be depressed, whereby the annular closure 155 will be moved downwardly from engagement with the annular extension 142, Fig. 6; and extrusion of plastic material is started. During the shifting of the table to this position, the raised portion 254' of the cam 254, Fig. 42, is positioned to depress the roller 253 against the tension of the spring 256, whereby the cup mold halves 236 and 237 are brought together about the end of the tube 126, and are held in that position by the compression of the spring 258, Fig. 3, as provided for by movement of the connecting rod 247 in respect to the clevis 246. For the duration of the contact of the bottom closure feed section 182 of the cam 180 with the finger 179, plasticated material will be forced under pressure between the inner surface of the cup mold 238 defined by the cup mold halves 236 and 237 and the lower surface of the annular closure 155, whereby there is formed a body of plastic material of tubular cross section 526, Figs. 20 and 23, with one end 527 completely closed.

When the finger 179, Fig. 39, drops from the bottom closure feed section 182 of the cam 180 to the partial closure section 183 thereof, the compression spring 152, Fig. 1, will raise the annular closure 155 a part of the way to the shut-off position, whereby the outer surface of the closed end 527 is raised above the inner surface of the cup mold 238. Immediately upon the separation of these two surfaces, Fig. 21, the raised portion 254' of the cam 254, Fig. 42, will pass beyond the roller 253 and thereby permit the spring 256 to separate the cup mold halves 236 and 237 and move them to their open position. At this point the side wall feed section 184 of the cam 180 engages the finger 179, whereby the annular closure 155 is again depressed to its full feed position; whereupon the extrusion of the plastic body of tubular cross section is continued downwardly toward the mold halves 464' and 465', which latter are still open and separated from each other, in the lower position of the table 317. Simultaneously with the engagement of the side wall feed section 184 of the cam 180 with the finger 179, the raised portion 283' of the cam 283, Fig. 41, engages the rocker arm 281, whereby the valve stem 277 is actuated to admit air at low pressure into the plastic body of tubular cross section during the extrusion thereof. This pressure remains applied thereto until extrusion is discontinued. During the extruding as aforesaid the table 317 moves up to position 5A and afterward, before the extrusion is completed, one of the cam surfaces 364, Fig 9, of the box casing 342 engages the pin 374, Fig. 11, whereby the roller 373 comes into actuating engagement with one of the slots 354 of the Geneva gear 353, whereby the arm 391 is actuated, bringing the roller 393 into engagement with the yoke 459, Fig. 13, whereby the latter is rotated and the racks associated with the mold halves 464' and 465' are actuated to close the mold against the mold bottom 468'. The roller 393 then leaves the yoke 459 and passes into actuating engagement with the yoke 506, whereby the clamp arms 503' are moved into clamping engagement with the mold halves 464' and 465' to hold the latter closed; after which the roller 393 is moved out of engagement with the yoke 506 and returns to its original and normally stationary position.

At about this time the raised portion 226, Fig. 38, of the cam 225 engages the roller 224, whereby the rod 213, Fig. 1, is raised against the tension of the spring 222 and the top mold ring 185 is moved downwardly against the tops of the closed mold halves 464' and 465' and is held there by the compression of the spring 214, Fig. 2. Immediately after this, the side wall feed section 184 of the cam 180 and the raised portion of the cam 283 pass from engagement with their respective fingers, whereby the low pressure air is cut off and the extruding of plastic material is stopped. After this the raised portion of the cam 282 engages the bell crank 280, whereby the high pressure valve stem 275 is actuated to admit air under high pressure into the tubular plastic body 526, Fig. 23, and expands it to the cooled inner mold surfaces of the mold halves 464' and 465', the top mold ring 185, and the mold bottom 468' against the pressure of the air trapped between the mold halves 464' and 465', the mold bottom 468' and the top mold ring 185, whereby a formed article is blown uniformly against the mold and with substantially uniform wall thickness, the trapped air being properly vented as herein described.

Following this, the raised section 314, Fig. 36, of the table raising cam 313 passes from engagement with the roller 312, Fig. 1b, whereby the weight of the table 317 and of the parts carried thereby moves the mold halves 464' and 465' downwardly from the tube 126 with the top mold ring 185 following it for a distance, sufficient for the shoulder 187, Fig. 17, to sever the top of the blown article from any fins of plastic material between the lower end of the tube 126 and the annular closure 155, the actuation of the top mold ring 185 to cause it to move with the mold for this short distance being caused by the expansion of the spring 214, causing also the movement of the hollow rod 216 to restore the parts to their normal position. The initial movement of the rod 213 by the cam 225 was more than that necessary for holding the top mold ring 185 against the mold halves 464' and 465', the excess having been taken up by compression of the spring 214. At this point the raised surface 226, Fig. 38, of the cam 225 leaves the roller 224, whereby the tension spring 222 contracts and raises the top mold ring 185 slidably on the tube 126 to its upper position thereon.

Upon the completion of the downward movement of the mold halves 464' and 465', the pin 336, Fig. 4a, comes in contact with one of the slots 302 of the Geneva gear 301, whereby the arm 320, Figs. 15 and 16, is rotated and the table 317 is shifted to the right hand position; whereupon the raised portion 314 of the table raising cam 313, Figs. 1b and 36, engages the roller 312 and raises the table 317 to bring the mold halves 464' and 465' up to the disc 517 (seen at the right, Figs. 4 and 28) where the molding surface 519 of the latter engages that portion of the blown article which is formed in the top mold ring 185 and reverses it against the inner surface of the mouth of the blown article. It is noted here that while the mold halves 464' and 465' are continuously cooled (for thermoplastic material), the top mold ring 185 is cooled to a lesser degree, so that while the main body of the blown article has become cooled to a firm and rigid state, the part formed in the top mold ring is still sufficiently plastic for this reversing action and results in a substantially integral or welded lip.

In a cycle of action similar to that above described for mold halves 464' and 465', a blown article is being formed in the mold halves 464 and 465 and different stages of the two cycles in one set of molds and the other in the other set of molds will take place simultaneously and continuously while the machine is kept in operation and is fed with plastic material.

After the reversal of the upper part of the neck portion of a blown article as above described and the blowing of an article in the mold halves 464 and 465, the table raising cam 313 will again permit the weight of the table 317 and associated parts to carry the two sets of molds downwardly to the lower level, whereupon the Geneva gearing in the box casing 341, Fig. 9, will cause the roller 413 to rotate with its arm 411 and engage the yoke 506, Fig. 13, to unlock the mold halves 464' and 465', after which the yoke 459 is engaged and operated to open these mold halves. Thereafter the article blown in this mold can be removed either manually or by some mechanism, not shown.

While the apparatus herein disclosed has been described more particularly for use with thermoplastic material, it is contemplated that this or equivalent apparatus may be used in making hollow articles from any suitable organic plastic material, including not only thermoplastic materials, such as cellulose acetate compounds, but also thermosetting materials which may be initially rendered fluent and plastic in some suitable manner, as for example by a moderate degree of heat. After having been shaped to the desired forms in any suitable manner, the material used must be rigidified, by cooling in the case of thermoplastic materials or by subjecting to further and more intense heat in the case of thermosetting materials. All organic plastic materials which are operative and/or which may be handled by apparatus and/or according to the process herein disclosed are to be considered within the purview of this invention, it being understood that the temperature controlling means hereinabove described will be suitably modified as to the temperatures controlled thereby, in accordance with the characteristics of the particular plastic material being worked upon at any given time.

While there is herein shown and described a specific apparatus and a particular process for forming hollow articles, it is contemplated that many changes may be made in both the apparatus and/or the process without departing from the spirit of this invention. We do not wish to be limited, therefore, except by the scope of the appended claims, which are to be construed as broadly as the state of the prior art permits.

We claim:

1. Apparatus for fabricating organic plastic material into a tubular shape having a closed end, comprising a tube and a core with their adjacent surfaces spaced apart to define an annular passageway, said core being movable longitudinally in said tube, an openable closure for an end of said tube carried by said core, and a cup mold movable into and out of position against said tube in peripheral contact with said end thereof, said closure when in its open position and said cup mold when it is in position against said tube being together constructed and arranged to define a space which extends from all points in the periphery of said annular passageway to a common point within said cup mold.

2. Apparatus for fabricating organic plastic material into a tubular shape having a closed end, comprising a tube and a hollow core therein having their adjacent surfaces spaced apart to define an annular passageway, said core being movable longitudinally within said tube, a closure for said tube carried by said core and movable therewith into an open position and into a closed position against an end of said tube, said closure having an opening therethrough from its outer surface connecting with the interior of said hollow core, and a cup mold movable into position against said tube in peripheral contact with said end thereof and movable away from said end, said cup mold when in its tube-contacting position and said closure when in its open position being together constructed and arranged to define a space which extends from all points in the periphery of said annular passageway to a common point within said cup mold.

3. Apparatus for fabricating organic plastic material, comprising means for plasticating such material and for causing it to flow as a plastic body, means for conducting and confining the flowing plastic body into a hollow tubular chamber, means for receiving the outer or leading end of the hollow tubular body of plastic material to cause the flow thereof radially inwardly to a common point to form a closed leading end thereon, means for removing said receiving means, a mold in operative relation to said chamber to receive the closed-ended hollow tubular body of plastic material as it is continued in movement, means for applying fluid pressure within said hollow tubular body at a relatively low pressure, and means for subsequently increasing the fluid pressure applied within said hollow tubular body.

4. Apparatus for fabricating organic plastic material to form containers therefrom, comprising means for bringing such material to a fluent and moldable condition, means defining an annular passageway extending from the first-named means to an open outer end and including outer passage-forming means and a hollow core therein, the outer surface of which forms the inner surface of said annular passageway and which is movable longitudinally in said annular passageway in respect to said passage-forming means, a head carried by said hollow core at said outer end and movable with said core to positions to open and close said annular passageway and having an opening therethrough from its outer surface to the interior of said hollow core, a cup mold movable into and out of contacting position with the wall of said passage-forming means and fitting against the outer end thereof in sealing relation, while permitting movement into said cup mold of said head as the latter moves to its open position, the outer surface of said head when it is in its open position and the inner surface of said cup mold when it is in its contacting position together being constructed and arranged to define a cup-shaped space which connects circumferentially with said annular passageway, and means for applying fluid pressure to the space in said hollow core.

5. Apparatus according to claim 4, comprising in addition means for controlling the temperatures of the inner and outer walls of said annular passageway.

6. Apparatus according to claim 4, wherein said means for applying fluid pressure to the space in said hollow core comprises means effective to supply a gaseous medium at various predetermined different pressures.

7. Apparatus for forming containers from organic plastic material, comprising means for plasticating the material to bring it to a fluent and moldable condition, a nozzle defining an annular passageway for plastic material and including spaced inner and outer nozzle members, a mold movable into and out of a position to receive plastic material from the annular passageway of said nozzle, a closure for stopping flow of plastic material through said annular passageway at the exit end thereof and carried by the inner of said nozzle members, means for causing relative movement between said inner and outer nozzle members to move said closure to and from a position to close said annular passageway, and a cup mold movable into and out of position in sealing contact with said outer nozzle member around the exit end of said annular passageway, said closure being movable into said cup mold when the latter is in sealing contact with said outer nozzle member, in which position the outer surface of said closure and the inner surface of said cup mold define therebetween a supplementary mold cavity connected peripherally with said annular passageway.

8. Apparatus for forming blown articles of organic plastic material, comprising means defining a chamber having an annular orifice, a closure for said orifice, means for controlling the temperatures of the walls of said chamber, said orifice and said closure, means for passing organic plastic material in a moldable condition and under pressure through said chamber and said orifice, means connected to said closure for opening and closing it, a removable end-forming mold constructed and arranged to be brought into and out of sealing relation against the wall about said orifice and in spaced relation about said closure when the latter is in its open position, means for moving said end-forming mold to and from its position about said orifice as aforesaid, a mold ring adapted to engage the wall about said orifice, and a mold adapted to engage said mold ring.

9. Apparatus for forming hollow blown articles of organic plastic material, comprising means defining a chamber having an annular, laterally-opening orifice, a closure for said orifice, means for controlling the temperatures of the walls of said orifice and said closure, means for passing organic plastic material in a moldable condition and under pressure through said chamber and said orifice, means connected to said closure for opening and closing it, a removable end-forming mold constructed and arranged to be brought into and out of sealing relation against the wall about said orifice and in spaced relation about said closure when the latter is in its open position, a mold ring adapted to engage the wall about said orifice, means for resiliently urging said mold ring longitudinally of said wall toward the end thereof having said orifice, a mold adapted to engage said mold ring adjacent to said orifice when the mold ring is positioned rearwardly of the orifice so that said orfice opens into the interior of said mold, and means for relatively moving said chamber and said mold in a direction axial of the latter, the aforesaid parts being so constructed and arranged that on relative movement apart of said mold and said chamber subsequent to the forming of an article within said mold, said mold ring will be resiliently moved past said orifice to sever the plastic material forming an article within said mold from that remaining within said chamber in rear of said orifice.

10. Apparatus for fabricating organic plastic material, comprising a cored molding means having a removable end-molding portion, means for controlling the temperatures of the outer wall and the core of said molding means, means for moving plastic material under pressure into and through said molding means, a separate and distinct mold adapted to be moved into the place of said removable end-molding means after the latter has been removed from its position in cooperation with the remainder of the first named molding means, and means for applying fluid pressure through said core in the direction of said separate and distinct mold.

11. Apparatus for working organic material which is normally hard and strong and which becomes plastic upon the combined application of heat and pressure, comprising means for applying heat and pressure to said material to render it fluent and plastic including a pair of intermeshing feed screws, a casing fitting over said feed screws, the inner longitudinal surface of which is defined substantially by the surfaces of rotation of said feed screws when in mesh, a second pair of intermeshing feed screws on common axes with said first pair of feed screws, closures on said casing for the outer ends of said pairs of feed screws, means for rotating said pairs of feed screws to feed plastic material toward a point between said pairs, means defining conduits from each of said pairs, which said conduits taper to constrictions in directions away from said feed screw, and means defining a common passageway for the delivery of plasticated material from said constrictions.

12. Apparatus for plasticating organic material and forming articles therefrom, comprising a continuously operating plasticating means for bringing organic plastic material to a fluent and moldable condition, said means having an inlet end for the receipt of comminuted organic plastic material and an exit end for the delivery to a fabricating means of fluent moldable plastic material after the plastication thereof, an intermittently operating molding or fabricating means associated with said plasticating means, and means for receiving fluent plastic material from said plasticating means during the periods when said molding or fabricating means is not receiving plastic material therefrom and for delivering fluent plastic material which has been plasticated at a rate higher than that at which it can be consumed by said molding or fabricating means back to the inlet end of said plasticating means.

13. Apparatus for extruding organic plastic material in tubular form, comprising a nozzle having inner and outer nozzle members constructed and arranged to provide a laterally opening orifice between said members, said outer nozzle member and a portion of said inner nozzle member bounding said orifice having an outer surface generated by a line parallel to the axis of said nozzle, a shearing means axially slidable on said nozzle and arranged by movement across said orifice to shear an extruded portion of plastic material, means for moving said shearing means axially of said nozzle, and means for controlling the temperature of said shearing means.

14. Apparatus for forming hollow blown articles from organic plastic material, comprising a nozzle including inner and outer nozzle members spaced to provide a tubular passage and an annular orifice through which plastic material may be extruded from the nozzle, means for forming a closed end on the tubular body of plastic material extruded from the nozzle, means for extruding plastic material through the nozzle, a mold cooperable with said nozzle in forming a hollow blown article, means to supply fluid pressure through said nozzle to expand the closed-ended body of plastic material to conformity with said mold, means to control the temperature of said mold to rigidify plastic material therein, a mold top ring slidable axially on said nozzle and cooperable with said mold, and means for controlling the temperature of that portion at least of said mold top ring that comes into contact with plastic material in the forming of an article.

15. Apparatus for forming hollow blown articles from organic plastic material, comprising a nozzle including inner and outer nozzle members spaced to provide a tubular passage therebetween and an annular orifice opening laterally of said nozzle through which plastic material may be extruded, means for extruding plastic material through said nozzle, means for forming a closed end for the tubular body of plastic material being extruded from the nozzle, a mold cooperable with said nozzle in forming a hollow blown article, means for relatively axially moving said mold and said nozzle to bring them into and out of cooperative relation with one another, means to supply fluid pressure through said nozzle to expand a closed-ended hollow body of plastic material extruded therefrom into conformity with said mold in forming an article, means for controlling the temperature of said mold to rigidify plastic material extruded and expanded therein, a combined mold top ring and shearing means axially slidable on said nozzle and arranged to cooperate with said mold when the latter is at its operative position in respect to said nozzle in completing the forming of a molding cavity and also arranged upon the axial separation of said mold and said nozzle to move across said orifice to shear plastic material which was extruded therefrom from plastic material remaining within said nozzle, and means for controlling the temperature of that portion at least of said mold top ring that comes into contact with plastic material in the forming of an article.

16. Apparatus for forming hollow blown articles from organic plastic material, comprising a nozzle including inner and outer nozzle members spaced to provide an annular, laterally opening orifice through which plastic material may be extruded, a mold cooperable with said nozzle in the forming of a hollow blown article from plastic material extruded from the nozzle, means for relatively axially moving said mold and said nozzle to bring them into and out of cooperative relation with one another, means for extruding plastic material through said nozzle, a combined mold top ring and shear movable axially of said nozzle and cooperable with said mold when the latter is in its operative position in respect to said nozzle in completing the cavity of said mold, and means for moving said mold top ring axially of said nozzle including mechanical means tending to urge said mold top ring axially of said nozzle into engagement with said mold, the last named means having a movement in excess of that required to bring said mold top ring into engagement with said mold, and a compressible spring interposed between the actuating means for the mold top ring and said ring and constructed and arranged upon movement of said actuating means to be compressed upon the completion of the movement of the actuating means after the mold type ring has engaged said mold, the parts being further so constructed and arranged that upon relative axial movement apart of said nozzle and said mold, said spring will expand, moving said nozzle across said orifice to sever plastic material within said mold from that remaining within said nozzle.

ENOCH T. FERNGREN.
WILLIAM H. KOPITKE.